(12) United States Patent
Dietle et al.

(10) Patent No.: US 9,109,703 B2
(45) Date of Patent: Aug. 18, 2015

(54) HYDRODYNAMIC BACKUP RING

(75) Inventors: Lannie Laroy Dietle, Houston, TX (US); Aaron Richie, Houston, TX (US); Victor Garcia, Jr., Richmond, TX (US); Jeffrey D. Gobeli, Houston, TX (US); John Erick Schroeder, Houston, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 109 days.

(21) Appl. No.: 13/026,045

(22) Filed: Feb. 11, 2011

(65) Prior Publication Data

US 2012/0038113 A1   Feb. 16, 2012

Related U.S. Application Data

(60) Provisional application No. 61/337,667, filed on Feb. 11, 2010.

(51) Int. Cl.
*F16J 15/40*   (2006.01)
*F16J 15/32*   (2006.01)
*F16J 15/16*   (2006.01)

(52) U.S. Cl.
CPC .................................. *F16J 15/166* (2013.01)

(58) Field of Classification Search
USPC .................... 277/549, 551, 569, 584, 301
See application file for complete search history.

(56) References Cited

U.S. PATENT DOCUMENTS

| | | | |
|---|---|---|---|
| 2,253,932 A | 8/1941 | Gilkerson | |
| 2,394,800 A | 2/1946 | Murphy | |
| 2,442,687 A | 6/1948 | Heathcott | |
| 2,459,472 A | 1/1949 | Tremolada | |
| 2,520,306 A | 8/1950 | Detweiler | |
| 2,608,385 A | 8/1952 | Stahl | |
| 2,706,655 A | 4/1955 | Showalter | |
| 2,728,620 A | 12/1955 | Krueger | |
| 2,934,368 A | 4/1960 | Adamson | |
| 2,998,288 A | 4/1961 | Newhouse | |
| 3,271,039 A | 9/1966 | Kohl | |
| 3,305,241 A * | 2/1967 | Hart ............................. | 277/547 |
| 3,497,225 A | 2/1970 | Workman | |
| 3,627,337 A | 12/1971 | Pippert | |
| 3,730,284 A | 5/1973 | Striegler | |

(Continued)

FOREIGN PATENT DOCUMENTS

| | | | |
|---|---|---|---|
| JP | 1991-1521 U | * | 10/1989 |
| JP | 06147327 A | * | 5/1994 |

(Continued)

*Primary Examiner* — Vishal Patel
*Assistant Examiner* — Stacy Warren
(74) *Attorney, Agent, or Firm* — Douglas W. Rommelmann; Andrews Kurth LLP

(57) ABSTRACT

A seal backup ring is provided with undulating surfaces which create circumferential convergence with a relatively rotatable surface. The backup ring is configured so that differential pressure acting across a rotary seal forces portions of the backup ring against the relatively rotatable surface, closing, or substantially closing, the extrusion gap that the rotary seal is exposed to. In response to relative rotation between the backup ring and the mating relatively rotatable surface, the circumferential convergence promotes hydrodynamic lubrication within the dynamic interface that exists between the backup ring and the relatively rotatable surface. The modulus of elasticity of the backup ring is greater than the modulus of elasticity of the rotary seal.

94 Claims, 17 Drawing Sheets

(56) References Cited

U.S. PATENT DOCUMENTS

| | | | |
|---|---|---|---|
| 3,801,114 A * | 4/1974 | Bentley | 277/559 |
| 3,848,880 A * | 11/1974 | Tanner | 277/584 |
| 3,868,105 A | 2/1975 | Bentley | |
| 3,921,987 A | 11/1975 | Johnston et al. | |
| 3,923,315 A | 12/1975 | Hadaway | |
| 3,929,340 A | 12/1975 | Peisker | |
| 3,970,321 A | 7/1976 | Dechavanne | |
| 3,973,781 A | 8/1976 | Grorich | |
| 3,984,113 A | 10/1976 | Bentley | |
| 4,084,826 A | 4/1978 | Vossieck et al. | |
| 4,094,519 A | 6/1978 | Heyn et al. | |
| 4,118,856 A | 10/1978 | Bainard et al. | |
| 4,183,543 A | 1/1980 | Antonini | |
| 4,240,676 A | 12/1980 | Anderson et al. | |
| 4,288,083 A | 9/1981 | Braconier | |
| 4,336,945 A | 6/1982 | Christiansen et al. | |
| 4,387,902 A | 6/1983 | Conover | |
| 4,421,425 A | 12/1983 | Foucher et al. | |
| 4,440,405 A | 4/1984 | Schaus et al. | |
| 4,441,722 A | 4/1984 | Pichler | |
| 4,451,050 A | 5/1984 | Repella | |
| 4,484,753 A | 11/1984 | Kalsi | |
| 4,496,251 A | 1/1985 | Ide | |
| 4,501,431 A | 2/1985 | Peisker et al. | |
| 4,515,486 A | 5/1985 | Ide | |
| 4,542,573 A | 9/1985 | Bainard | |
| 4,602,806 A * | 7/1986 | Saliger | 285/41 |
| 4,610,319 A | 9/1986 | Kalsi | |
| 4,619,534 A | 10/1986 | Daly | |
| 4,671,519 A | 6/1987 | Bras | |
| 4,676,668 A | 6/1987 | Ide | |
| 4,695,063 A | 9/1987 | Schmitt et al. | |
| 4,705,277 A | 11/1987 | Repella | |
| 4,717,160 A | 1/1988 | Zitting et al. | |
| 4,726,695 A | 2/1988 | Showalter | |
| 4,729,569 A | 3/1988 | Muller et al. | |
| 4,739,998 A | 4/1988 | Steusloff et al. | |
| 4,750,747 A | 6/1988 | Holzer | |
| 4,770,548 A | 9/1988 | Otto | |
| 4,783,086 A | 11/1988 | Bras et al. | |
| 4,789,166 A | 12/1988 | Rericha et al. | |
| 4,900,042 A * | 2/1990 | Genda | 277/584 |
| 5,002,289 A | 3/1991 | Yasui et al. | |
| 5,024,364 A | 6/1991 | Nash | |
| 5,054,938 A | 10/1991 | Ide | |
| 5,066,144 A | 11/1991 | Ide | |
| 5,102,236 A | 4/1992 | Ide | |
| 5,112,143 A | 5/1992 | Ide | |
| 5,137,373 A | 8/1992 | Ide | |
| 5,139,275 A | 8/1992 | Ehrmann et al. | |
| 5,143,382 A * | 9/1992 | Maringer | 277/584 |
| 5,188,462 A | 2/1993 | Hooper et al. | |
| 5,190,299 A | 3/1993 | Johnston | |
| 5,195,754 A | 3/1993 | Dietle | |
| 5,195,757 A | 3/1993 | Dahll | |
| 5,222,815 A | 6/1993 | Ide | |
| 5,230,520 A | 7/1993 | Dietle et al. | |
| 5,265,964 A | 11/1993 | Hooper | |
| 5,284,392 A | 2/1994 | Ide | |
| 5,306,021 A | 4/1994 | Morvant | |
| 5,372,431 A | 12/1994 | Ide | |
| 5,427,387 A | 6/1995 | Johnston | |
| 5,489,155 A | 2/1996 | Ide | |
| 5,503,479 A | 4/1996 | Ide | |
| 5,511,886 A | 4/1996 | Sink | |
| 5,513,917 A | 5/1996 | Ide et al. | |
| 5,558,444 A | 9/1996 | Ide | |
| 5,593,231 A | 1/1997 | Ippolito | |
| 5,664,888 A | 9/1997 | Sabin | |
| 5,678,829 A | 10/1997 | Kalsi et al. | |
| 5,692,757 A | 12/1997 | Straub | |
| 5,711,534 A | 1/1998 | Bengoa et al. | |
| 5,738,358 A | 4/1998 | Kalsi et al. | |
| 5,791,658 A | 8/1998 | Johnston | |
| 5,823,541 A | 10/1998 | Dietle et al. | |
| 5,829,338 A | 11/1998 | Chrestoff et al. | |
| 5,873,576 A | 2/1999 | Dietle et al. | |
| 5,915,696 A | 6/1999 | Onuma et al. | |
| 5,921,555 A | 7/1999 | Johnston | |
| 5,938,344 A | 8/1999 | Sabin | |
| 6,007,105 A | 12/1999 | Dietle et al. | |
| 6,016,880 A | 1/2000 | Hall et al. | |
| 6,036,192 A | 3/2000 | Dietle et al. | |
| 6,105,968 A | 8/2000 | Yeh et al. | |
| 6,109,618 A | 8/2000 | Dietle | |
| 6,120,036 A | 9/2000 | Kalsi et al. | |
| 6,139,020 A | 10/2000 | Friend et al. | |
| 6,189,896 B1 | 2/2001 | Dickey et al. | |
| 6,227,547 B1 | 5/2001 | Dietle et al. | |
| 6,315,302 B1 | 11/2001 | Conroy et al. | |
| 6,334,619 B1 | 1/2002 | Dietle et al. | |
| 6,382,634 B1 | 5/2002 | Dietle et al. | |
| 6,460,635 B1 | 10/2002 | Kalsi et al. | |
| 6,481,720 B1 | 11/2002 | Yoshida et al. | |
| 6,494,462 B2 | 12/2002 | Dietle | |
| 6,561,520 B2 | 5/2003 | Kalsi et al. | |
| 6,619,664 B1 | 9/2003 | Metz | |
| 6,685,194 B2 | 2/2004 | Dietle et al. | |
| 6,688,603 B2 | 2/2004 | vom Schemm | |
| 6,767,016 B2 | 7/2004 | Gobeli et al. | |
| 7,052,020 B2 | 5/2006 | Gobeli et al. | |
| 7,341,258 B2 * | 3/2008 | Holt et al. | 277/584 |
| 7,562,878 B2 | 7/2009 | Dietle et al. | |
| 7,770,898 B2 | 8/2010 | Dietle et al. | |
| 7,798,496 B2 | 9/2010 | Dietle et al. | |
| 8,282,107 B2 * | 10/2012 | Horiba et al. | 277/551 |
| 2001/0024016 A1 * | 9/2001 | Gobeli et al. | 277/400 |
| 2003/0205864 A1 | 11/2003 | Dietle et al. | |
| 2005/0156386 A1 * | 7/2005 | Ota et al. | 277/549 |
| 2006/0171616 A1 * | 8/2006 | Richie et al. | 384/121 |
| 2006/0214379 A1 | 9/2006 | James et al. | |
| 2007/0013143 A1 * | 1/2007 | Schroeder et al. | 277/551 |
| 2007/0160314 A1 | 7/2007 | Richie et al. | |
| 2007/0246894 A1 * | 10/2007 | Foote | 277/500 |
| 2009/0001671 A1 | 1/2009 | Dietle et al. | |
| 2010/0259015 A1 | 10/2010 | Dietle | |
| 2010/0264603 A1 | 10/2010 | Schroeder et al. | |

FOREIGN PATENT DOCUMENTS

| | | | |
|---|---|---|---|
| JP | 11013889 A * | 1/1999 | |
| WO | WO 2008029786 A1 * | 3/2008 | |

\* cited by examiner

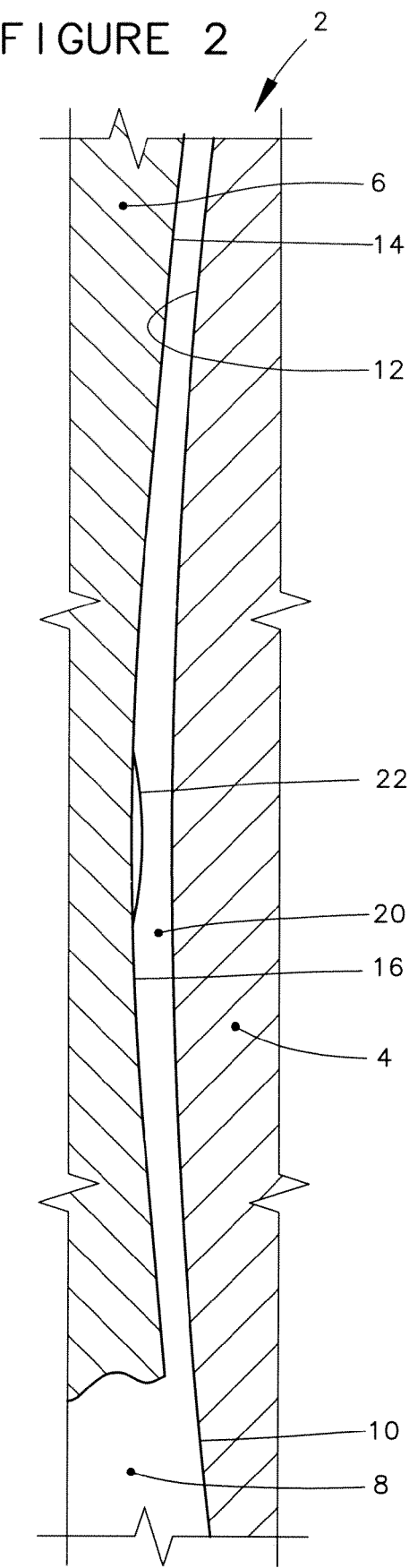
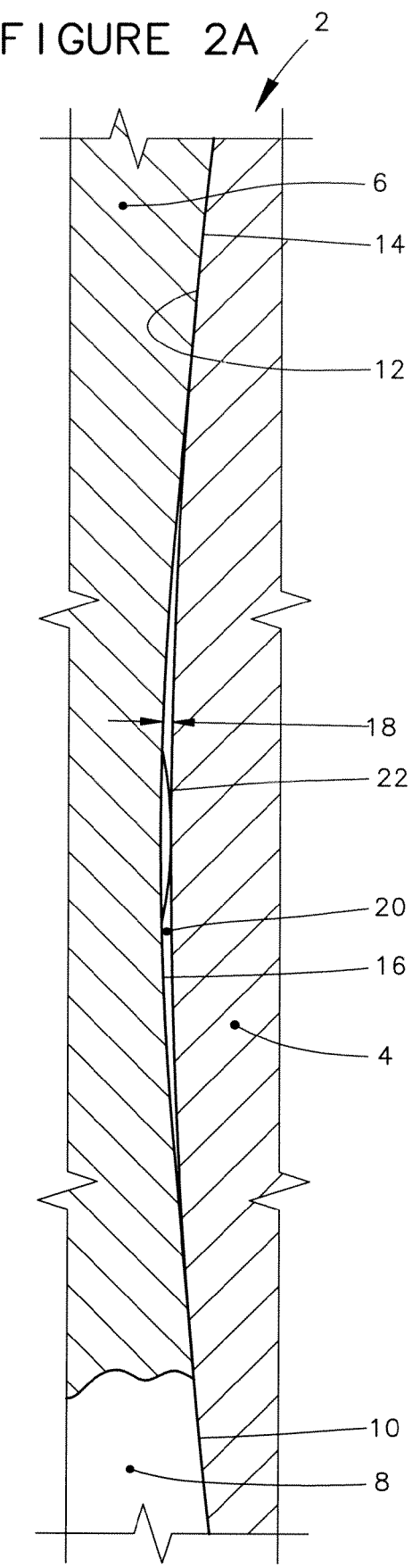

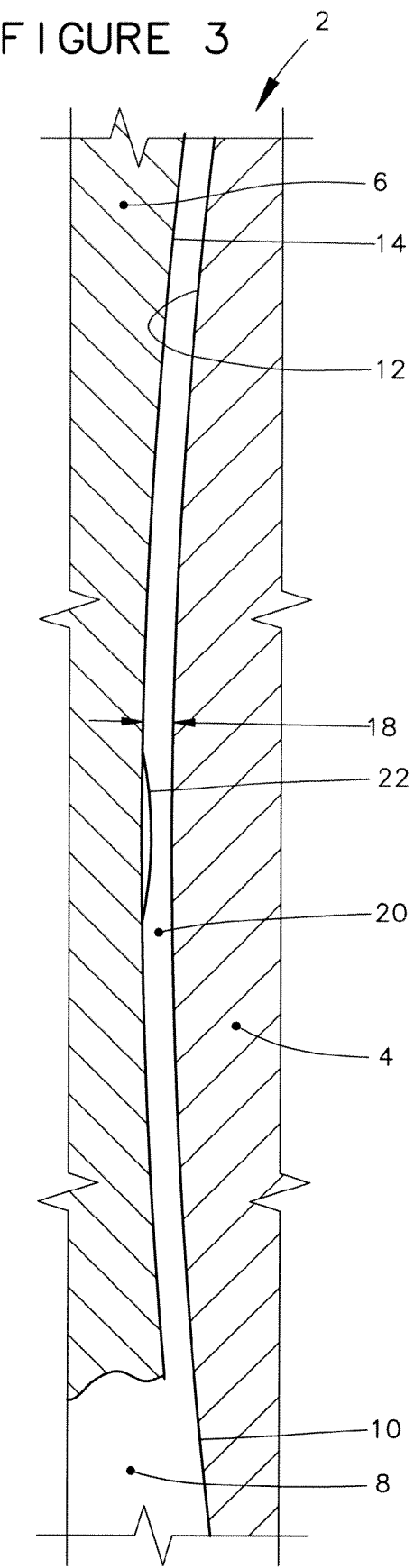
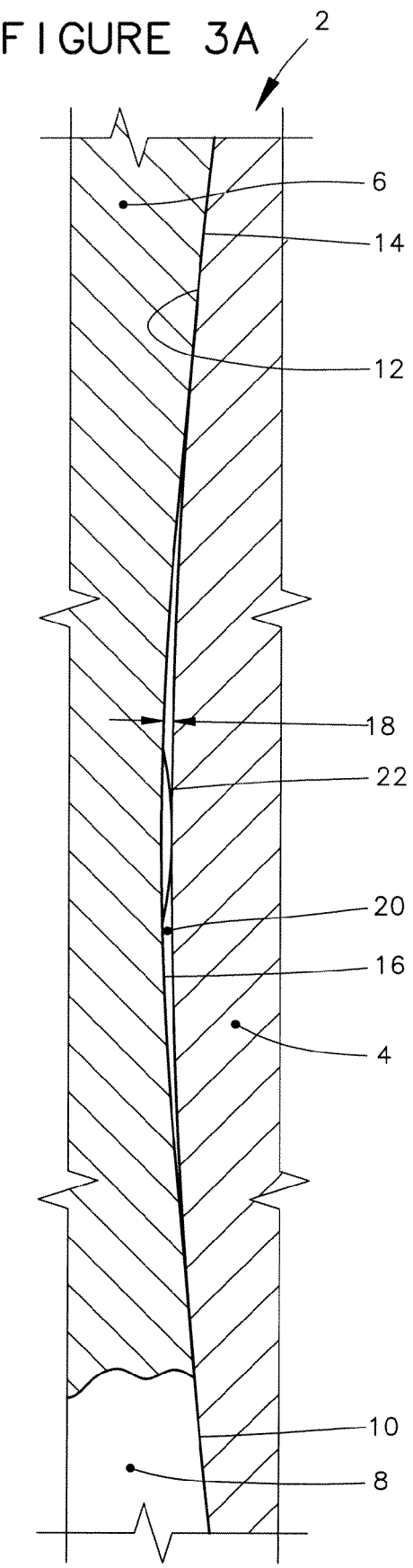

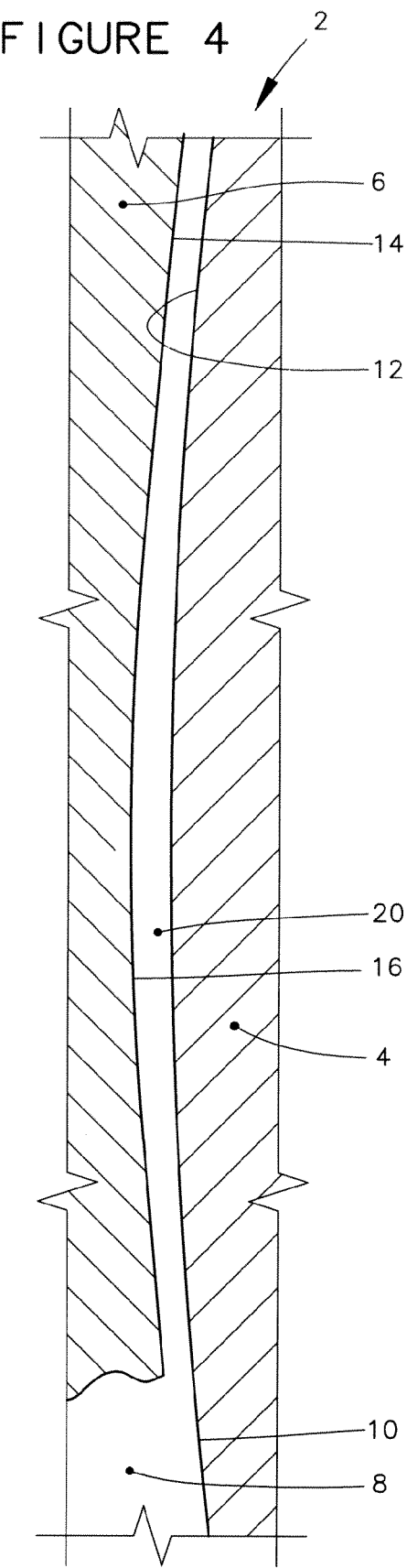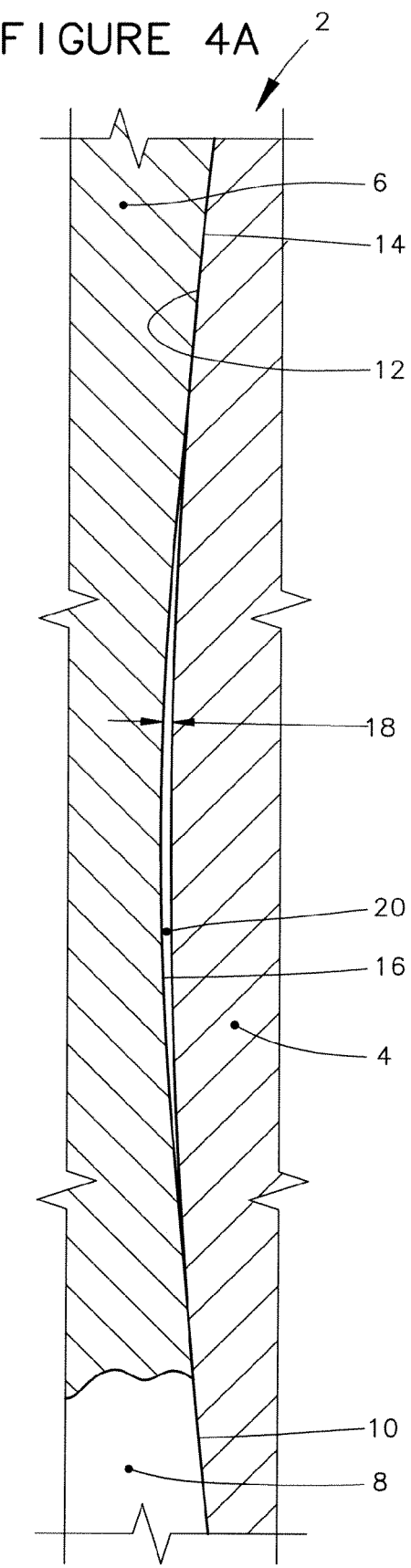

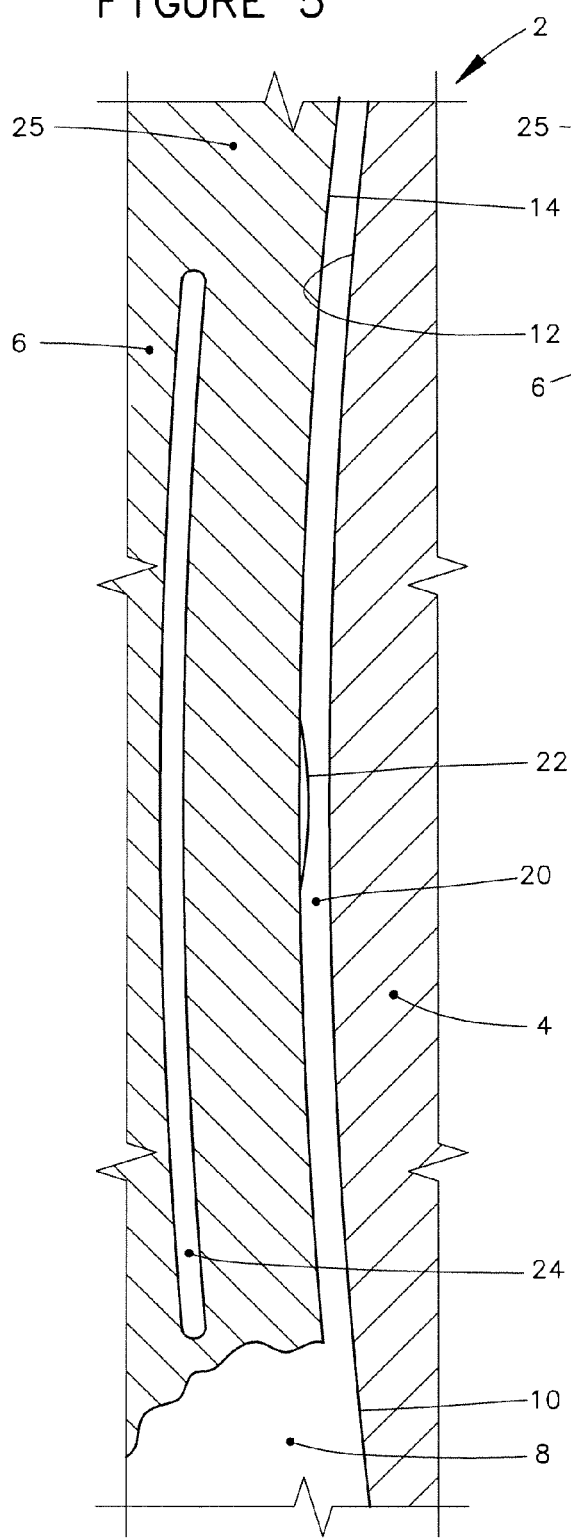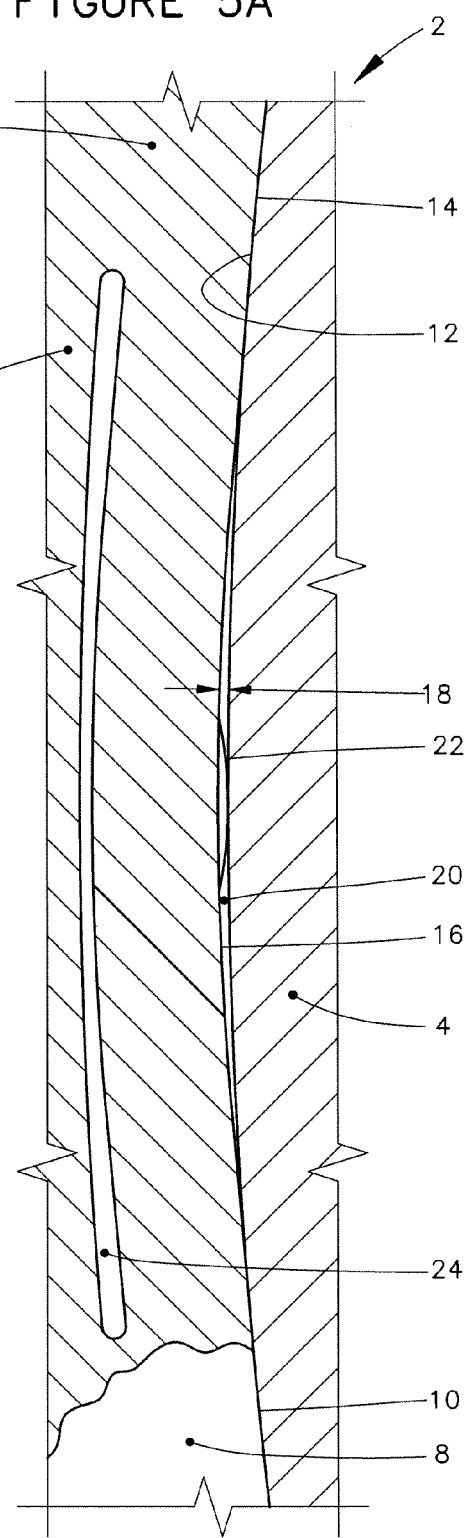

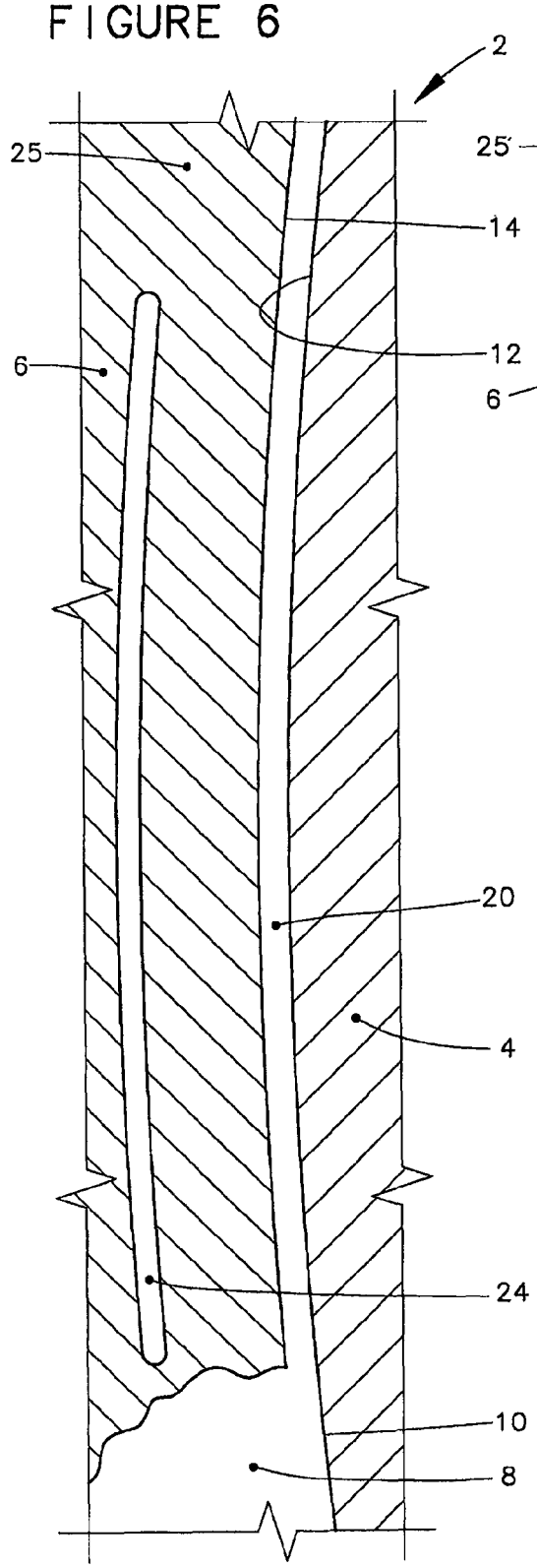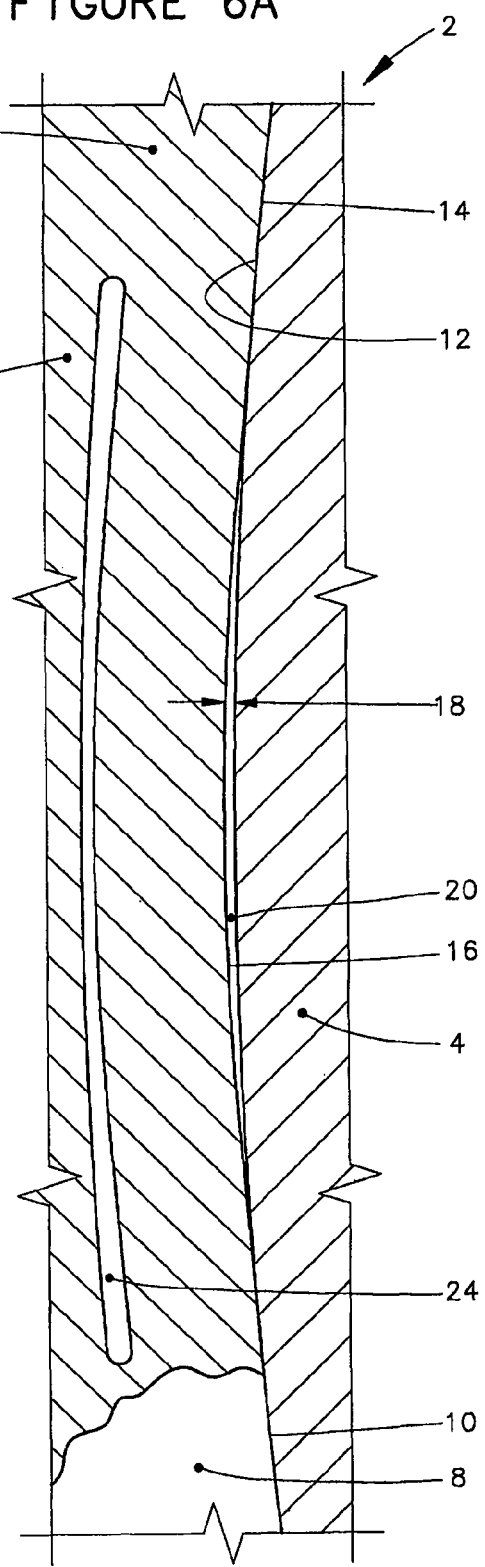

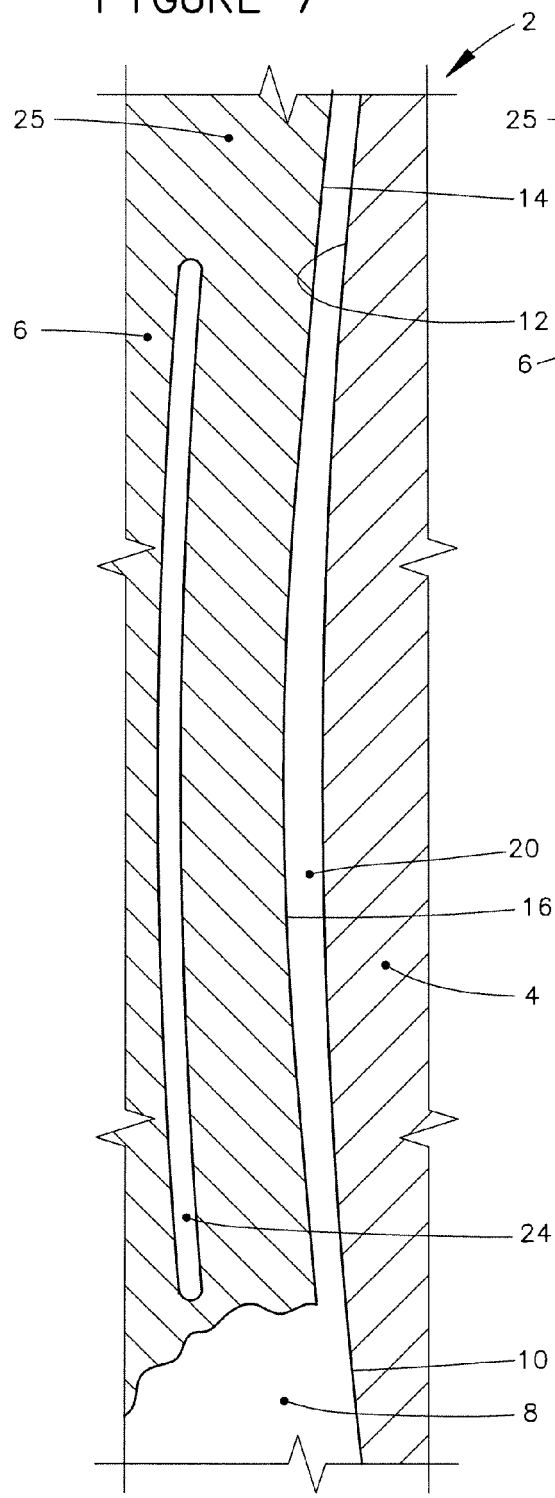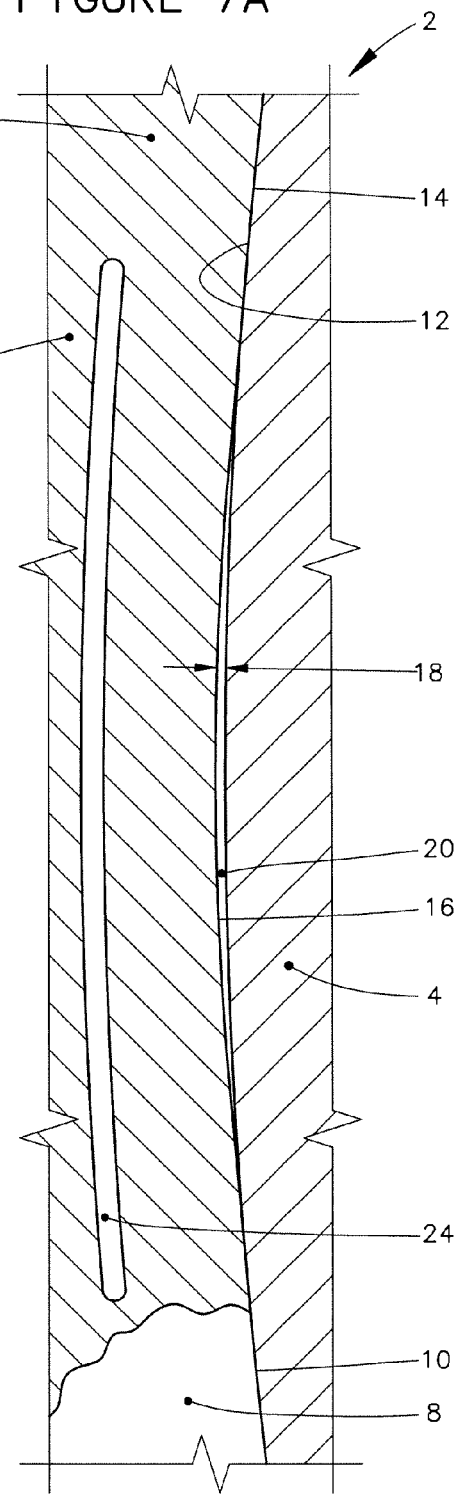

HYDRODYNAMIC BACKUP RING

CROSS-REFERENCE TO RELATED APPLICATIONS

This application claims the benefit of U.S. Provisional Application Ser. No. 61/337,667 filed Feb. 11, 2010 and entitled "High Pressure Rotary Seal".

BACKGROUND OF THE INVENTION

1. Field of the Invention

The present invention is related to rotary seals for use with relatively rotatable parts for fluid retention. More particularly, the present invention is related to a backup ring that is configured to increase the ability of a rotary seal to withstand differential pressure.

2. Description of the Related Art

The use of resilient rotary seals for establishing sealing between relatively rotatable machine components for fluid retention is known. The differential pressure that such resilient rotary seals can retain is limited by the extrusion resistance of the material used in the construction of the seal, and is also limited by the size of the extrusion gap clearance that exists between the seal housing and the mating relatively rotatable surface. The size of the extrusion gap clearance also influences interfacial lubrication of the seal.

The backup rings that are used with static seals and with reciprocating seals are unsuitable for use with rotary seals that are retaining significant differential pressure due to liabilities such as high friction, high wear, material flow, and damaging frictional heat.

SUMMARY OF THE INVENTION

The present invention relates generally to resilient rotary seals used for establishing sealing between relatively rotatable machine components for fluid retention. A backup ring is provided that is compatible with rotary use. The backup ring provides hydrodynamic lubrication within the dynamic interface between the backup ring and a mating relatively rotatable surface.

The backup ring establishes undulating recessed regions (hydrodynamic recesses) on an inner surface, to create at least one hydrodynamic wedge shape with respect to a mating relatively rotatable surface which has gradual convergence with the relatively rotatable surface in the circumferential direction.

The invention is used in a rotary sealing assembly where a relatively rotatable member (such as a shaft) is separated from the machine component by an extrusion gap, and a resilient rotary seal is in sealing engagement with the machine component and with the relatively rotatable member, in order to retain a fluid. A backup ring is located between the rotary seal and the extrusion gap. The backup ring has at least one dynamic surface that faces the relatively rotatable member and defines at least one hydrodynamic recess, and preferably defines a plurality of hydrodynamic recesses. At least part of the dynamic surface of the backup ring is arranged and designed to contact the relatively rotatable member when a force is applied to the backup ring.

The hydrodynamic recess establishes a clearance region between the backup ring and the relatively rotatable member. At least one end of the hydrodynamic recess forms a hydrodynamic inlet. Preferably, the part of the dynamic surface that contacts the relatively rotatable member merges smoothly with the hydrodynamic recess in the circumferential direction. The clearance region established by the hydrodynamic recess preferably becomes smaller as it approaches closer to the rotary seal, in order to minimize the clearance between the backup ring and the relatively rotatable member that the rotary seal is exposed to, in order to minimize extrusion damage to the rotary seal. If the rotary seal is a hydrodynamic rotary seal, the reduced extrusion gap that is provided by the backup ring also improves lubrication of the dynamic interface of the rotary seal.

The force that is exploited to cause the dynamic surface of the backup ring to contact the relatively rotatable member is typically differential pressure acting across the rotary seal. The hydrodynamic recess preferably has at least one end that converges gradually with the relatively rotatable member. The backup ring is exposed to a lubricating fluid. Upon relative rotation between the backup ring and the relatively rotatable member, the hydrodynamic recess wedges the lubricant between the backup ring and the relatively rotatable member for lubrication purposes. The gradually converging geometry promotes a strong hydrodynamic action that wedges a lubricant film of a predictable magnitude into the dynamic interface/footprint region between the backup ring and the relatively rotatable member in response to relative rotation. This lubricant film physically separates the dynamic surfaces of the backup ring and the relatively rotatable surface from each other, thus minimizing asperity contact, and reducing friction, wear and backup ring-generated heat, while permitting operation at higher differential pressure and speed combinations than otherwise would be possible with a non-hydrodynamic backup ring.

The backup ring is preferably configured to receive the aforementioned force at least partially through at least one energizing surface, and the backup ring is typically supported at least in part by a structural surface of the machine component. Embodiments are possible where the at least one energizing surface is generally conical in shape, or generally cylindrical in shape. The at least one energizing surface can be a plurality of energizing surfaces. All or part of the at least one energizing surface can also be wavy, in order to support the wavy lip flank of a hydrodynamic seal. The at least one energizing surface can be configured to contact the resilient rotary seal, and it can also be configured so that it contacts a structural surface of the machine component.

The force can be applied to the energizing surface through a resilient energizing material which is in contact with a portion of the backup ring. This energizing material can overhang the backup ring, or it can project into one or more recesses defined by the backup ring. The energizing material can be an integral part of the seal, an integral part of the backup ring, or a separate component. When the force is the result of differential pressure acting across the rotary seal, the pressure can be transmitted to the energizing surface by the resilient energizing material.

The hydrodynamic recess can be formed into the dynamic surface of the backup ring at the time of manufacture, if desired.

Alternatively, the hydrodynamic recess can also be formed or augmented by the use of undercut regions and/or projections which shape the dynamic surface to form the hydrodynamic recess when the backup ring receives force. This applied force can be produced by the differential pressure that is applied across the rotary seal.

When projections are used, the projection contacts the relatively rotatable member upon application of the force, thereby establishing and/or maintaining the hydrodynamic recess and its clearance region between the dynamic surface of the backup ring and the relatively rotatable member. When the projection forms the hydrodynamic recess, rather than merely supporting a pre-formed recess, the recess may be formed by force-induced flexure of the backup ring.

When undercut regions (weakening recesses) are used, differential pressure or other means causes an applied force which elastically flexes the backup ring at the undercut (and therefore unsupported) regions. This creates undulations in the dynamic surface of the backup ring, (herein called hydrodynamic recesses) which create initial hydrodynamic fluid wedges with respect to the corresponding relatively rotatable surface.

The weakening recess may be arranged and designed to distribute the force around the backup ring so that portions of the dynamic surface contact the relatively rotatable member, and portions of the dynamic surface do not contact the relatively rotatable member, thereby forming and/or maintaining the at least one hydrodynamic recess.

The backup ring preferably has a modulus of elasticity at the machinery extrusion gap that is greater than the modulus of elasticity of the resilient sealing material of the rotary seal. The backup ring faces and bridges the machinery extrusion gap, and defines and minimizes the effective extrusion gap clearance that the rotary seal is exposed to, in order to increase the differential pressure capability of the rotary seal. Plastic and metal are examples of backup ring materials that have a modulus of elasticity that is greater than the modulus of elasticity of resilient seal materials.

Preferably, the seals that are used with the backup ring of the present invention may incorporate one or more seal materials without departing from the spirit or scope of the invention, and may be composed of any suitable sealing material or materials, including elastomeric or rubber-like materials which may, if desired, be combined with various plastic materials such as reinforced polytetrafluoroethylene ("PTFE") based plastic. If desired, the rotary seals may be of monolithic integral, one piece construction or may also incorporate different materials bonded, co-vulcanised, or otherwise joined together to form a composite structure. When the backup rings are used with packings (such as, but not limited to oilfield washpipe packings), a preferred packing material is a fabric reinforced elastomer. Fabrics based on cotton and/or aramid fiber are sometimes used in construction of packings.

The invention is suitable for use with both compression-type (i.e. interference-type) and flexing, cantilever lip-type rotary seals. The compression-type rotary seal is maintained in direct compression between the machine component and the relatively rotatable member in order to establish sealing contact force with the machine component and the relatively rotatable member. The flexing lip-type seals include a flexible dynamic lip that contacts the relatively rotatable member. Sealing contact force is established by flexure of the dynamic lip, which can be assisted by energizing elements such as a spring or a compressed rubber element.

The invention can be configured for radial sealing applications where the rotary seal and the backup ring slide dynamically with respect to a relatively rotatable surface of generally cylindrical form, such as the outer surface of a shaft or sleeve, or the surface of a bore. Alternatively, the invention can also be configured for face sealing applications, where the rotary seal and the backup ring slide dynamically with respect to a relatively rotatable surface of generally planar form.

The backup ring can define at least one anti-rotation recess, wherein application of a force to the backup ring or the resilient rotary seal causes the resilient rotary seal to at least partially deform into the at least one recess to inhibit relative rotation between the rotary seal and the backup ring. Alternately, the rotary seal can include at least one projection arranged and designed to be received by the at least one recess of the backup ring when the backup ring contacts the resilient rotary seal, to inhibit relative rotation between the rotary seal and the backup ring.

The backup ring can include at least one anti-rotation projection configured to engage a recess of the machine component, in order to prevent rotation of the backup ring with respect to the machine component. The anti-rotation projection can project from an enlarged head that is embedded in the backup ring. The purpose of the enlarged head is to bridge the recess of the machine component, and thereby prevent the backup ring material from entering the recess. The enlarged head preferably has a modulus of elasticity that is greater than the portion of the backup ring that the enlarged head is embedded into.

The backup ring can include a shoulder positioned adjacent to the hydrodynamic recess, to provide support to the hydrodynamic recess, and help to prevent collapse of the hydrodynamic recess. The shoulder provides an abrupt transition between the hydrodynamic recess and the surrounding dynamic surface of the backup ring. The shoulder can be skewed with respect to the possible directions of relative rotation between the backup ring and the relatively rotatable member, in order to distribute lubricant across the dynamic surface of the backup ring. The backup ring can, if desired, be made in a V-shaped configuration to support a packing ring.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the preferred embodiments thereof which are illustrated in the appended drawings, which drawings are incorporated as a part hereof.

It is to be noted however, that the appended drawings illustrate only typical embodiments of this invention and are therefore not to be considered limiting of its scope, for the invention may admit to other equally effective embodiments.

In the Drawings:

FIG. 1 is a fragmentary cross-sectional view of a portion of a rotary sealing assembly according to a preferred embodiment of the present invention;

FIG. 1A is a fragmentary cross-sectional view of a rotary sealing assembly including a rotary seal and backup ring according to a preferred embodiment of the present invention;

FIG. 1B is a fragmentary cross-sectional view of a rotary sealing assembly including a rotary seal and backup ring according to another preferred embodiment of the present invention;

FIG. 1C is a fragmentary cross-sectional view of a rotary sealing assembly including a rotary seal and backup ring according to yet another preferred embodiment of the present invention;

FIG. 1D is a fragmentary cross-sectional view of a rotary sealing assembly including a rotary seal and backup ring according to still another preferred embodiment of the present invention;

FIG. 1E is a fragmentary cross-sectional view of a rotary sealing assembly including a rotary seal and backup ring according to an alternative preferred embodiment of the present invention;

FIG. 1F is a fragmentary cross-sectional view of a rotary sealing assembly including a rotary seal and backup ring according to an another alternative preferred embodiment of the present invention;

FIG. 1G is a fragmentary cross-sectional view of a rotary sealing assembly including a rotary seal and backup ring according to an yet another alternative preferred embodiment of the present invention;

FIG. 1H is a fragmentary cross-sectional view of a rotary sealing assembly including a rotary seal and backup ring according to an still another alternative preferred embodiment of the present invention;

FIG. 1J is a fragmentary cross-sectional view of a rotary sealing assembly including a rotary seal and backup ring according to another preferred embodiment of the present invention;

FIG. 1K is a fragmentary cross-sectional view of a rotary sealing assembly including a rotary seal and backup ring according to yet another preferred embodiment of the present invention;

Figure 1:
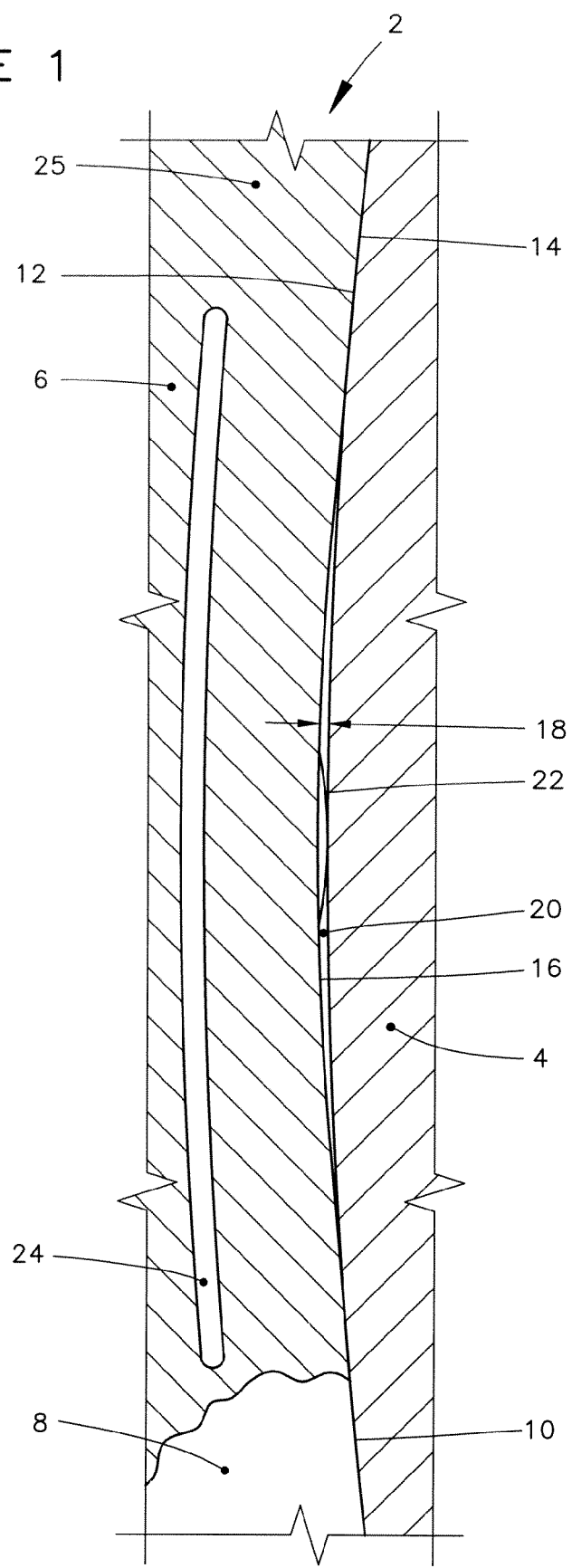
Figure 1A:
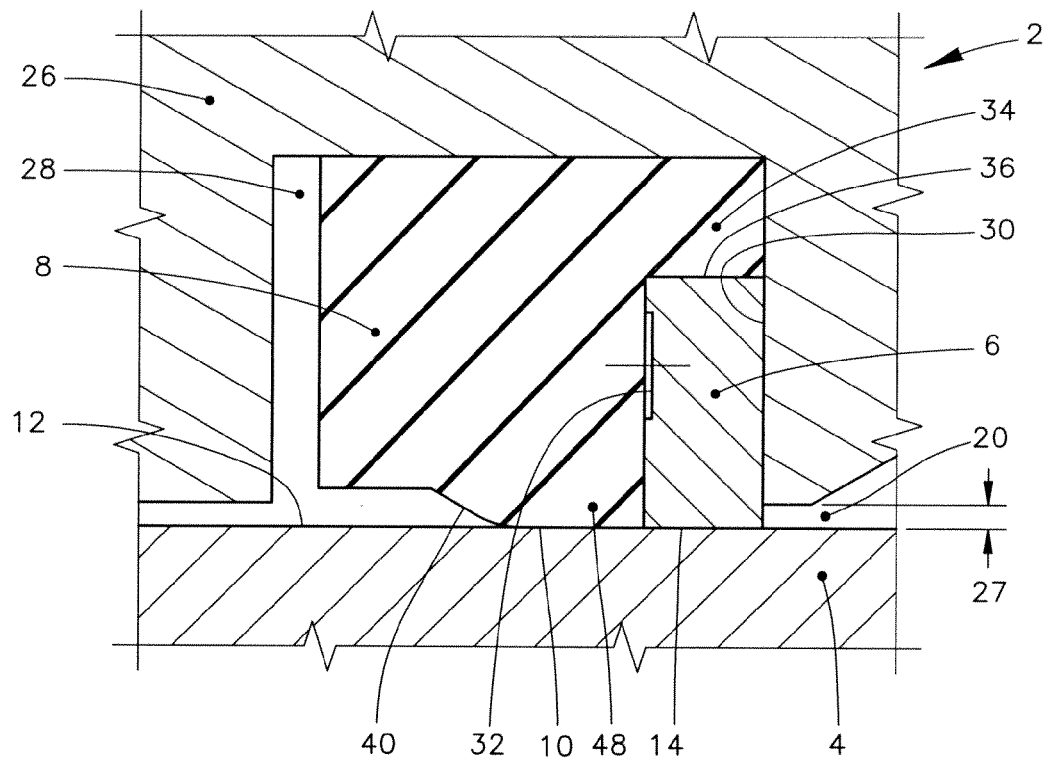
Figure 1B:
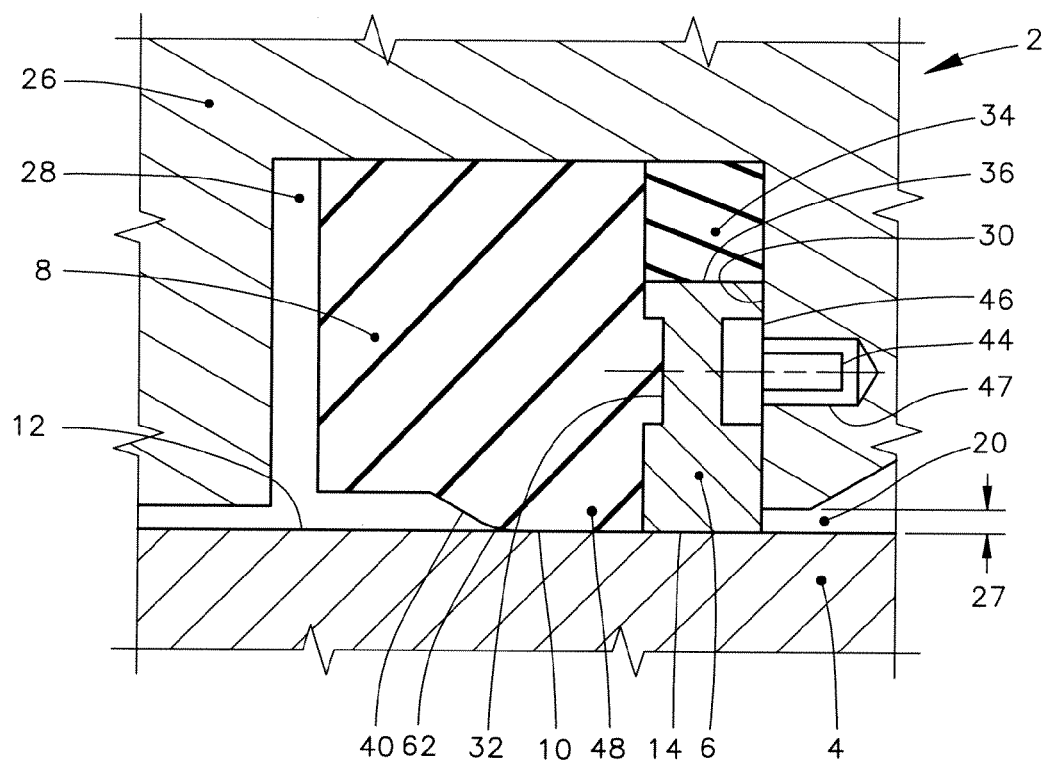
Figure 1C:
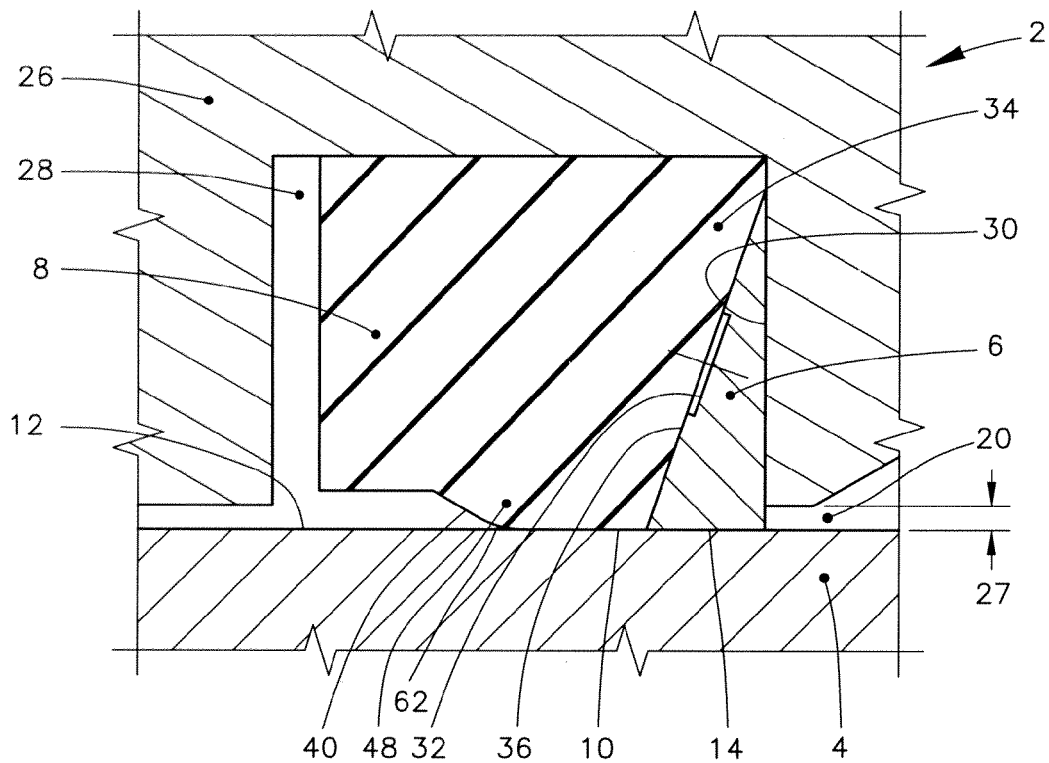
Figure 1D:
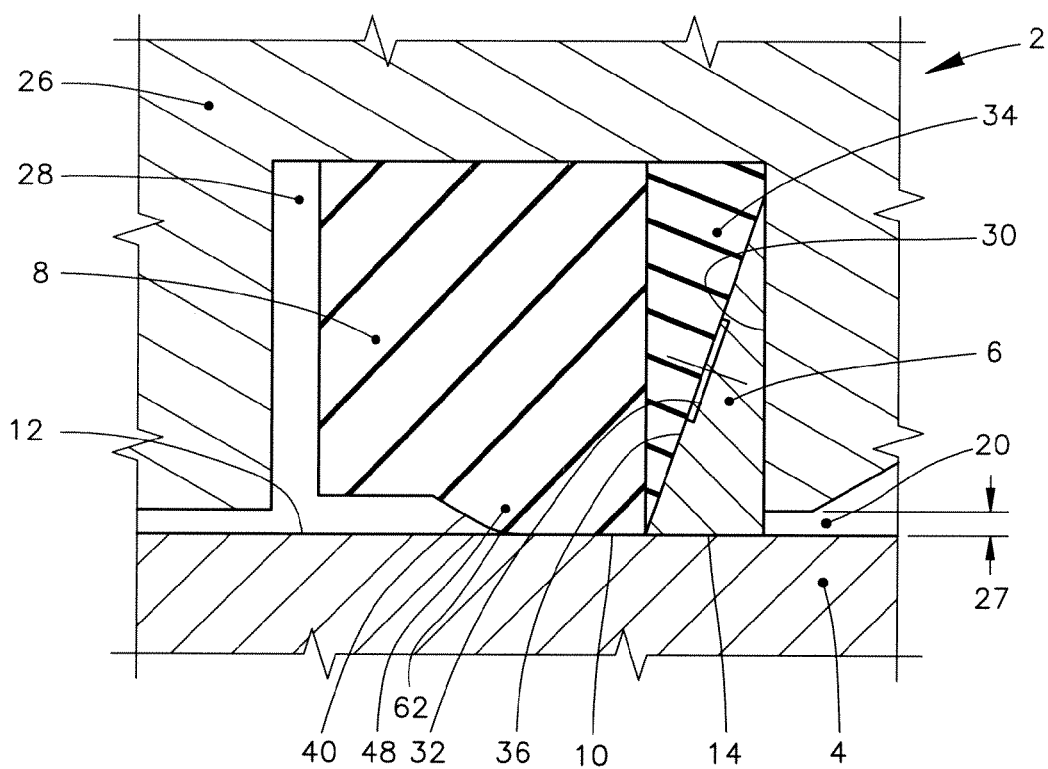
Figure 1E:
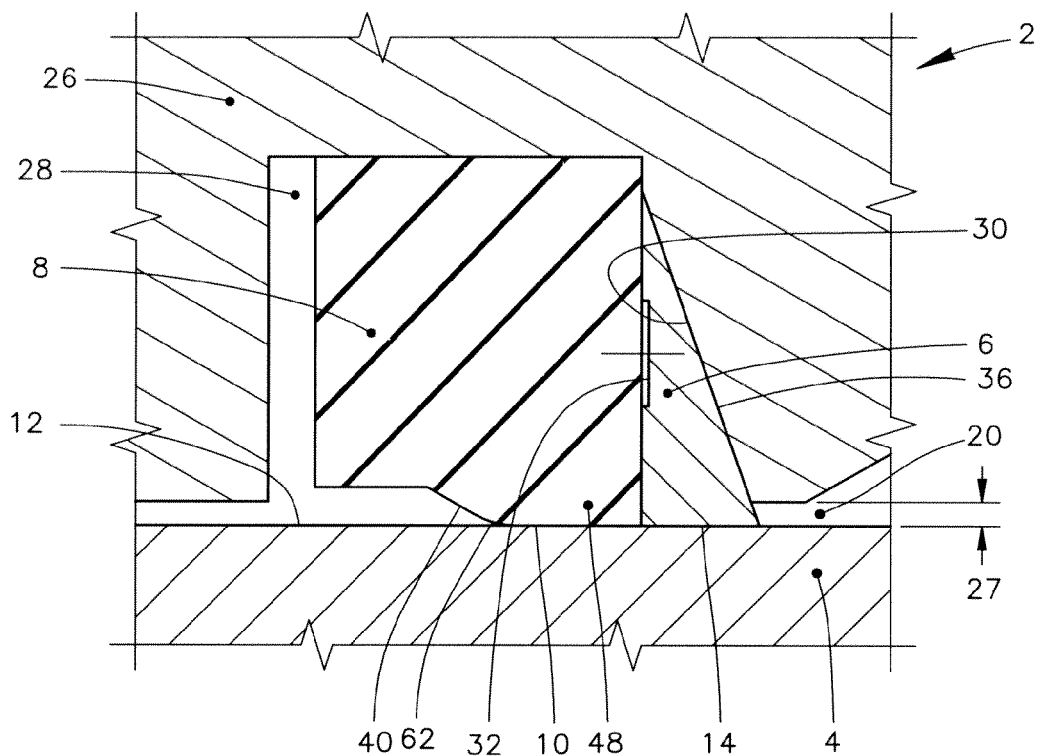
Figure 1F:
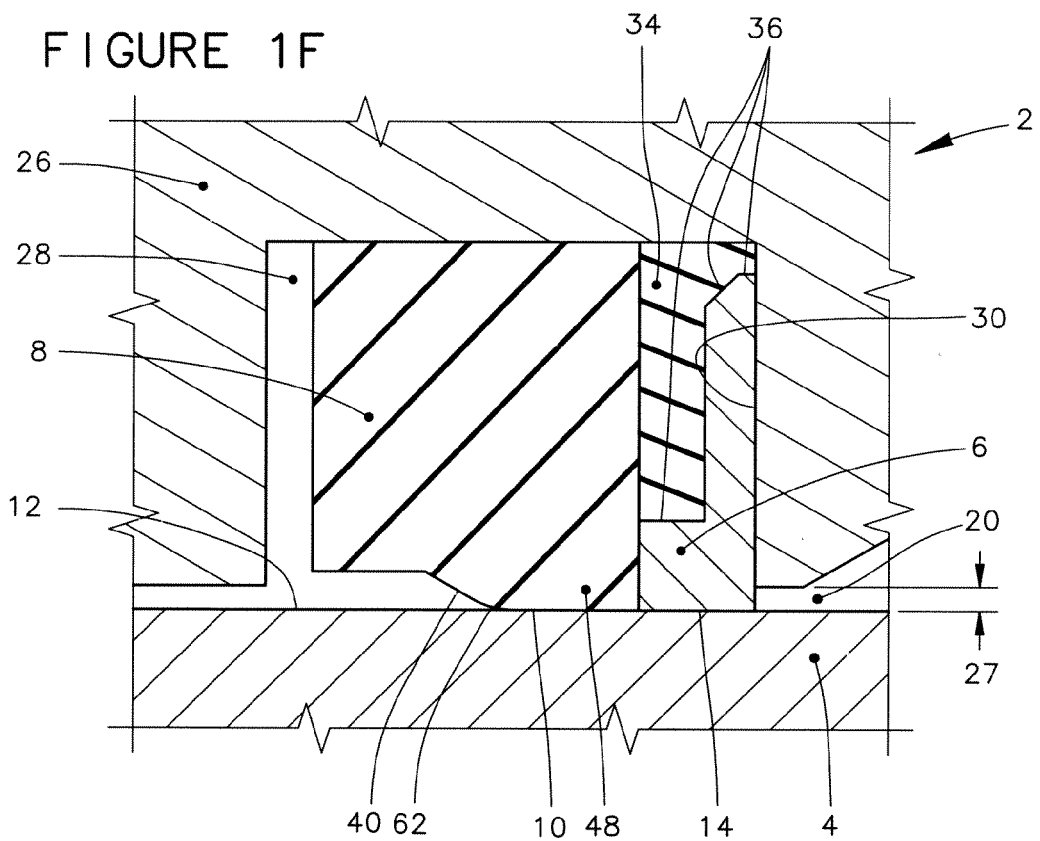
Figure 1G:
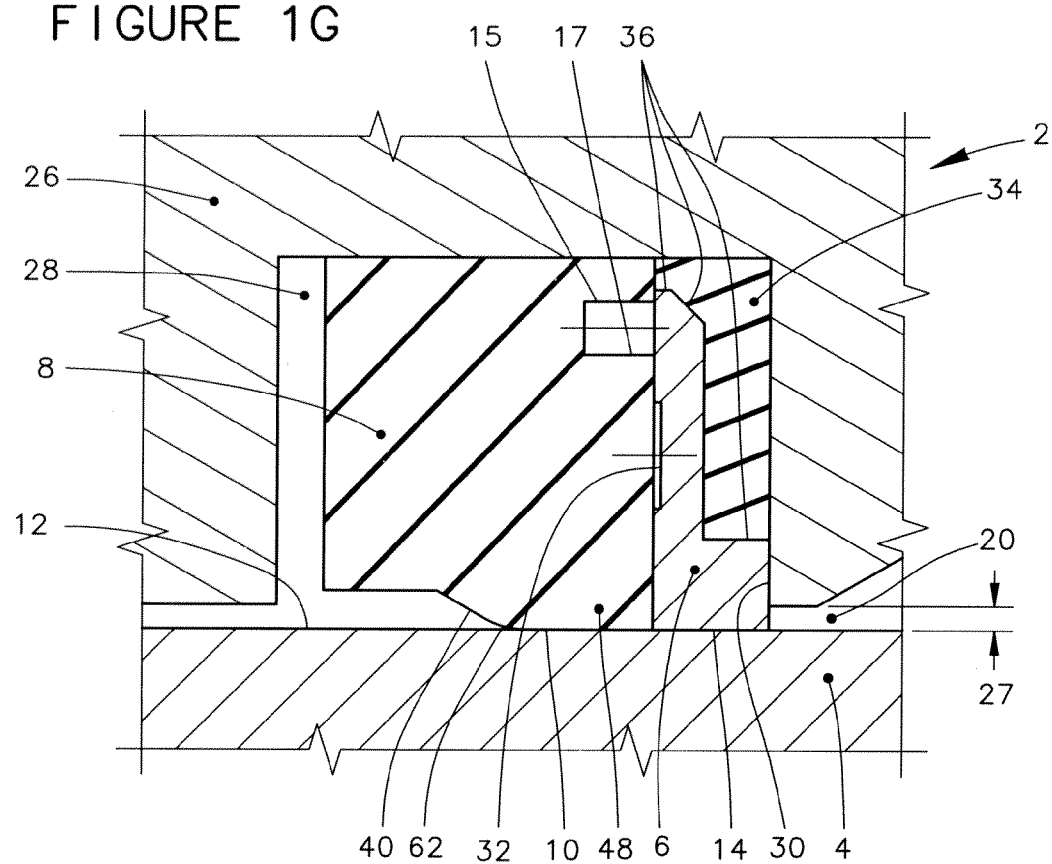
Figure 1H:
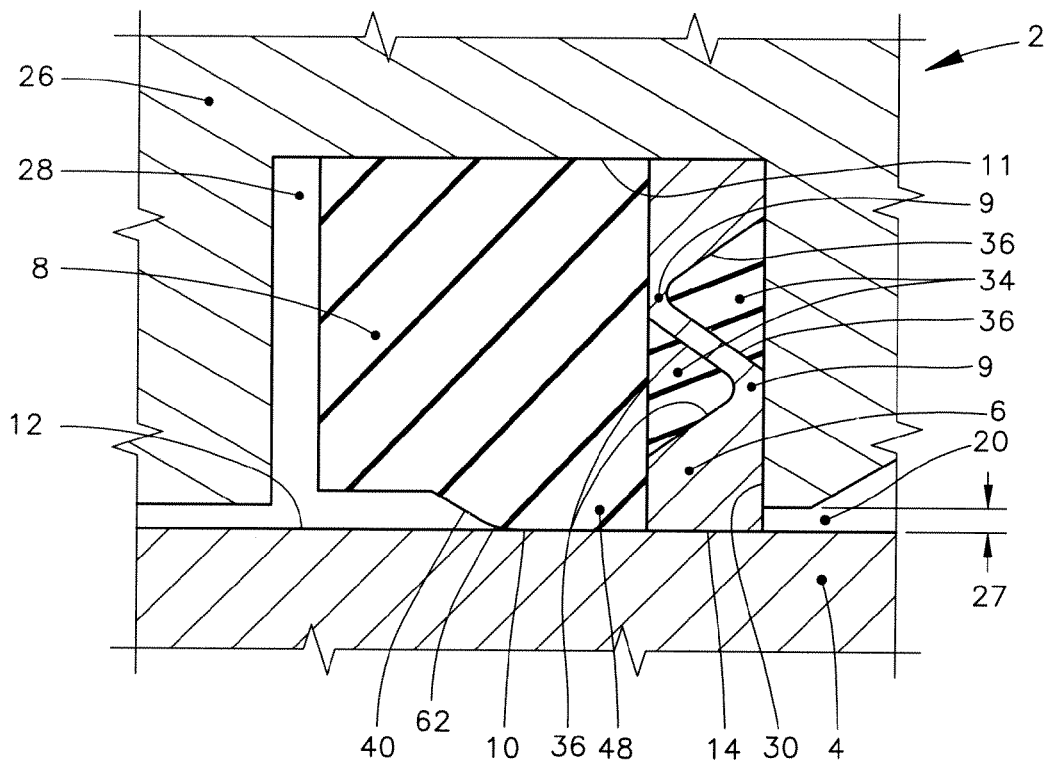
Figure 1J:
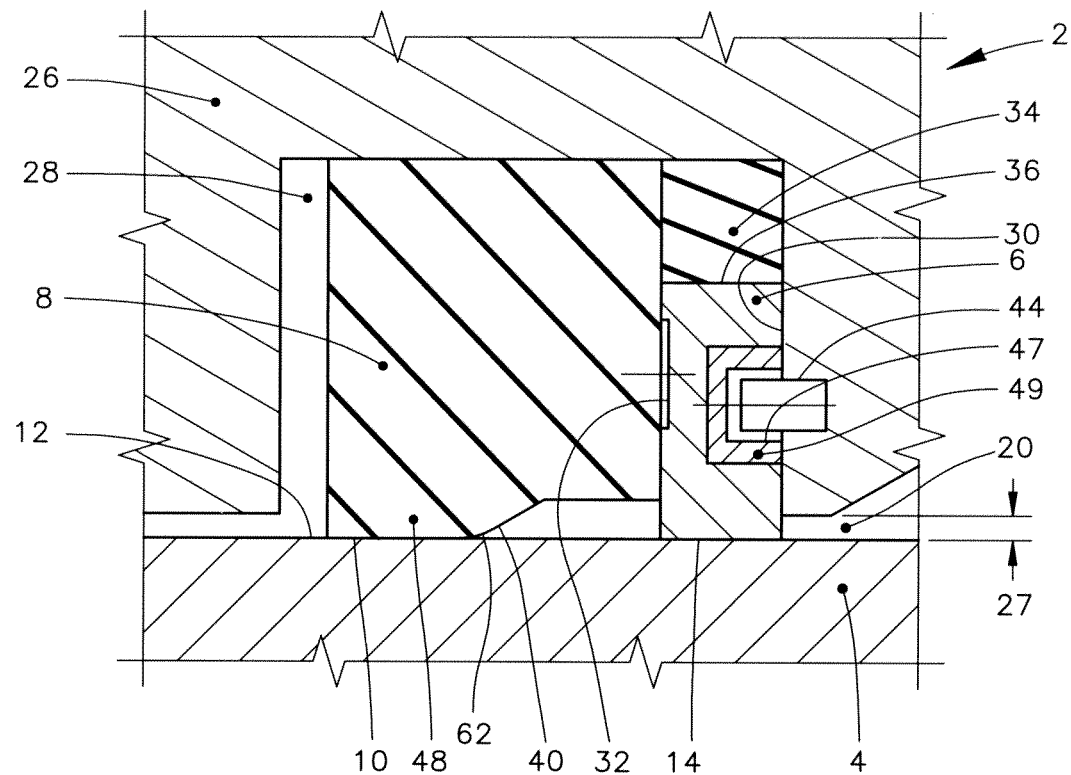
Figure 1K:
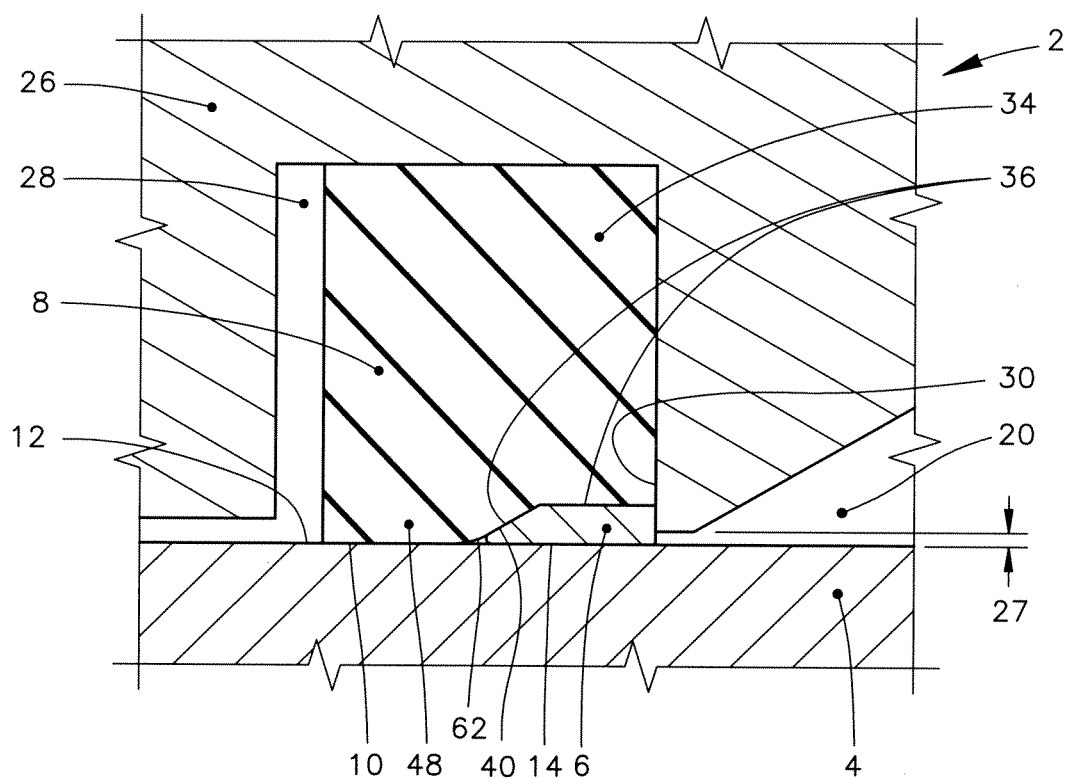
Figure 1L:
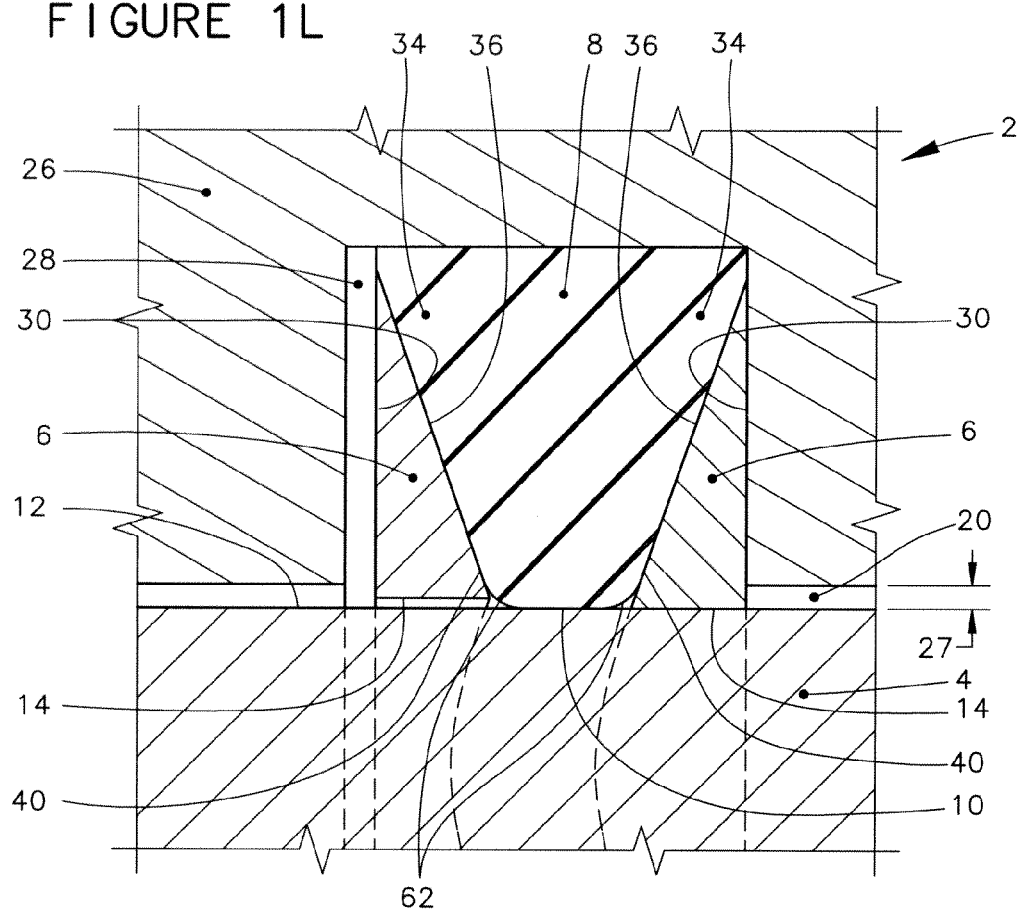
Figure 1M:
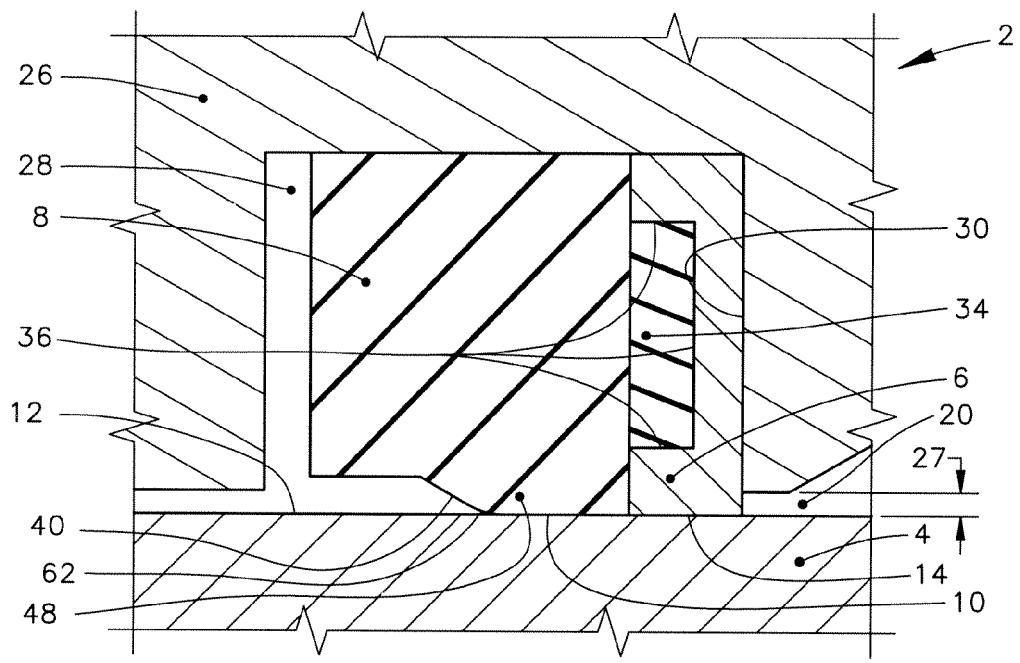
Figure 1N:
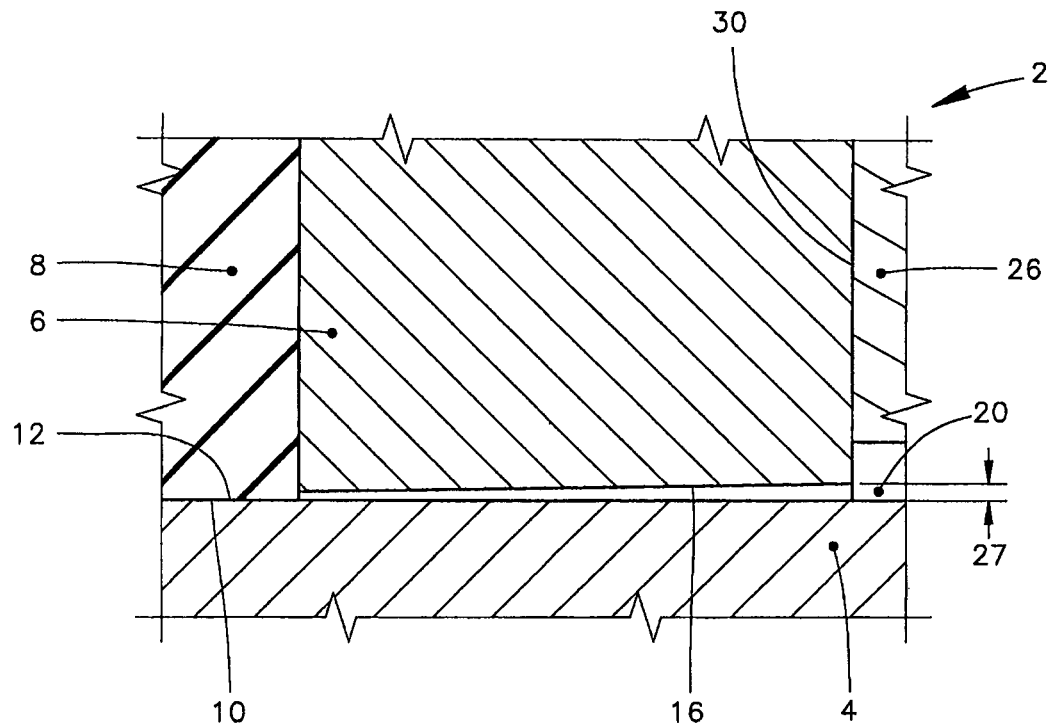
Figure 1P:
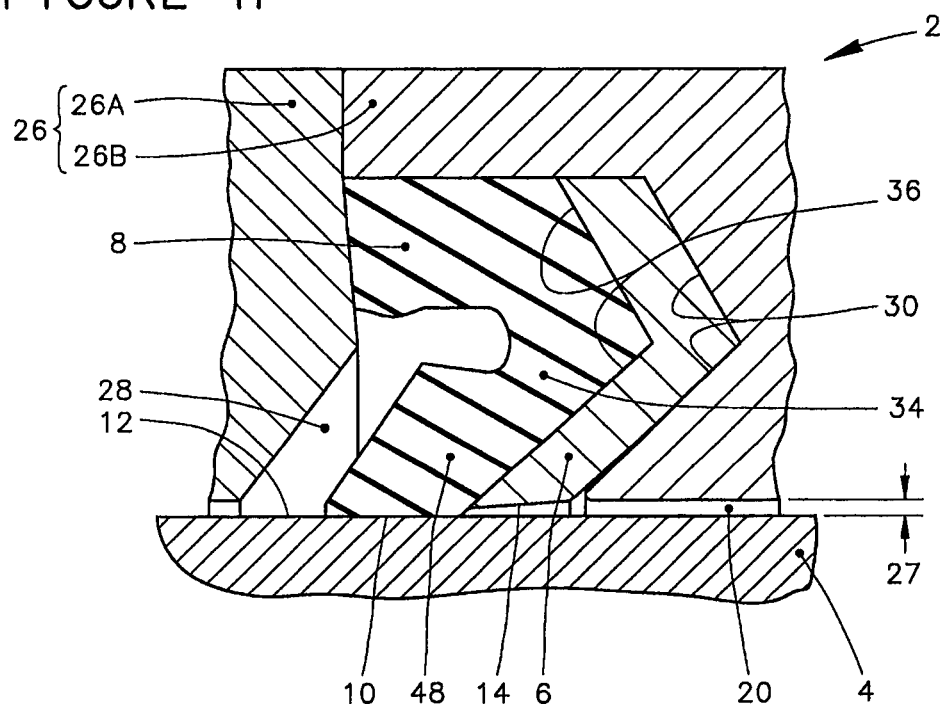
Figure 1Q:
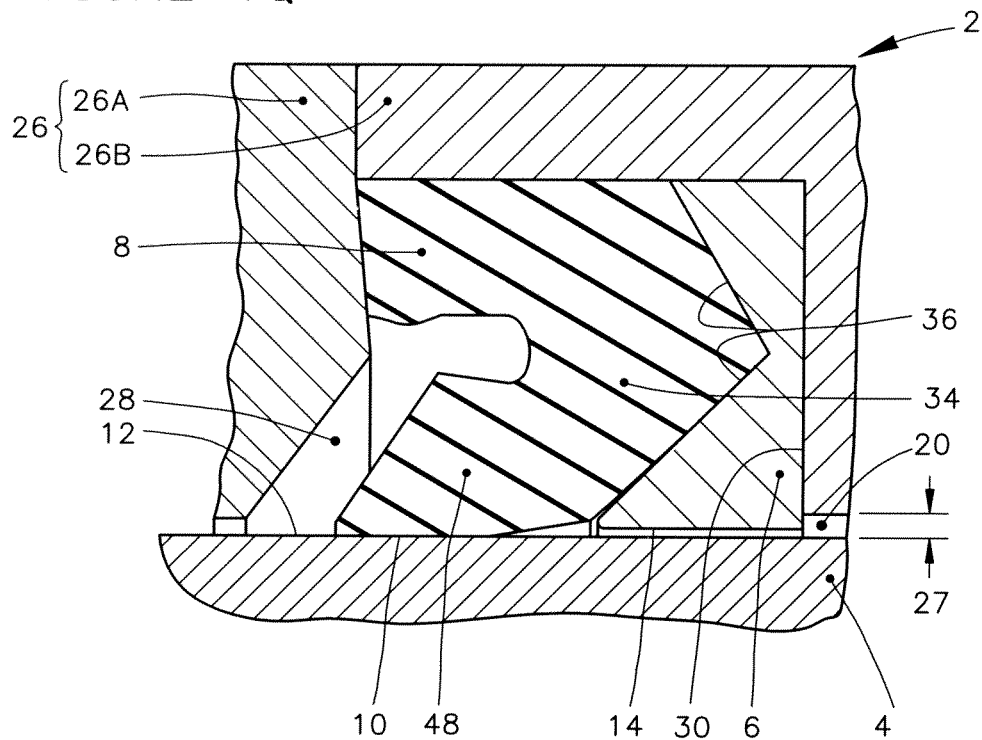
Figure 1R:
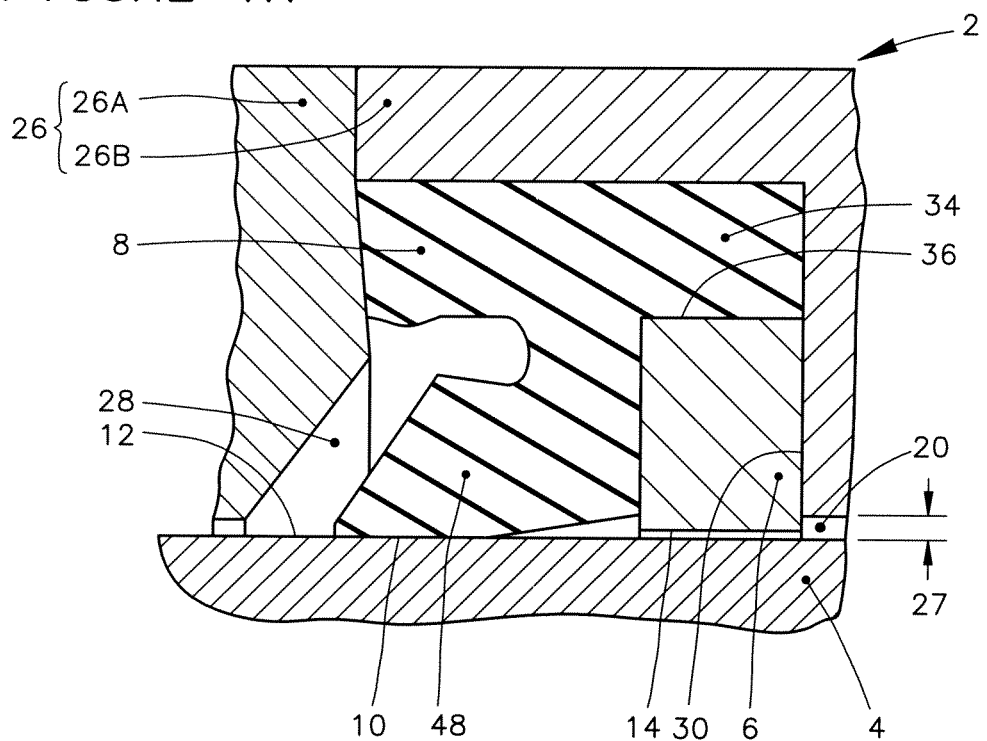
Figure 8:
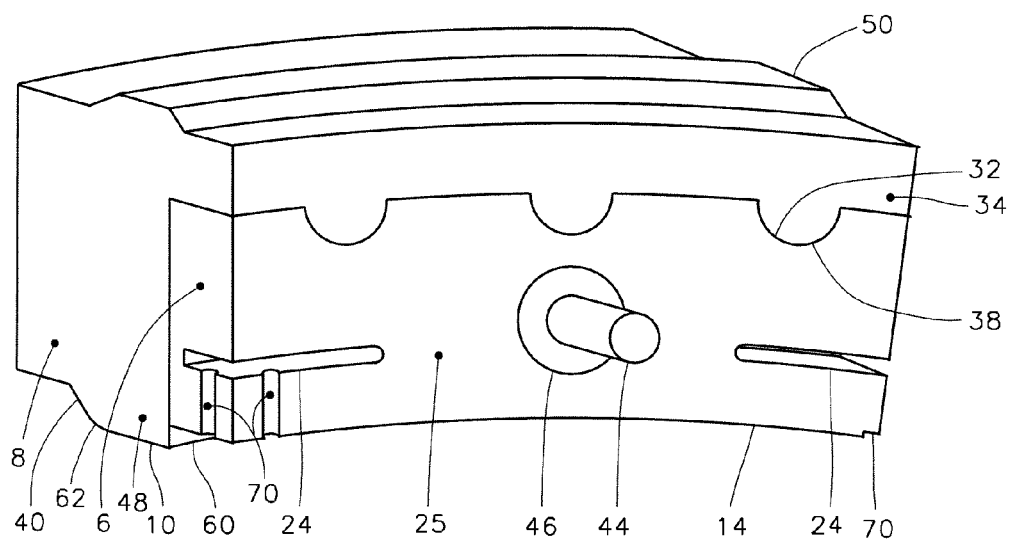
Figure 9:
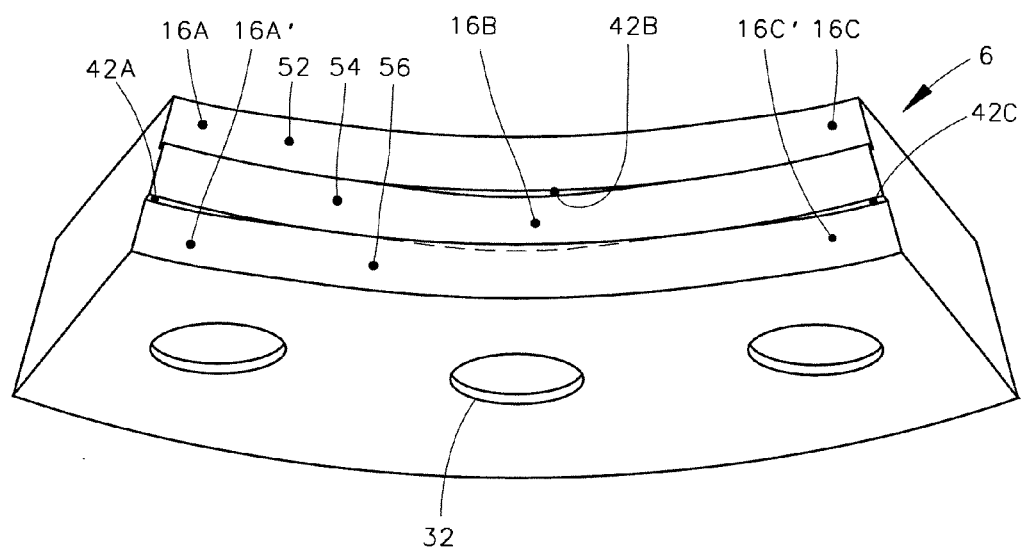
Figure 10:
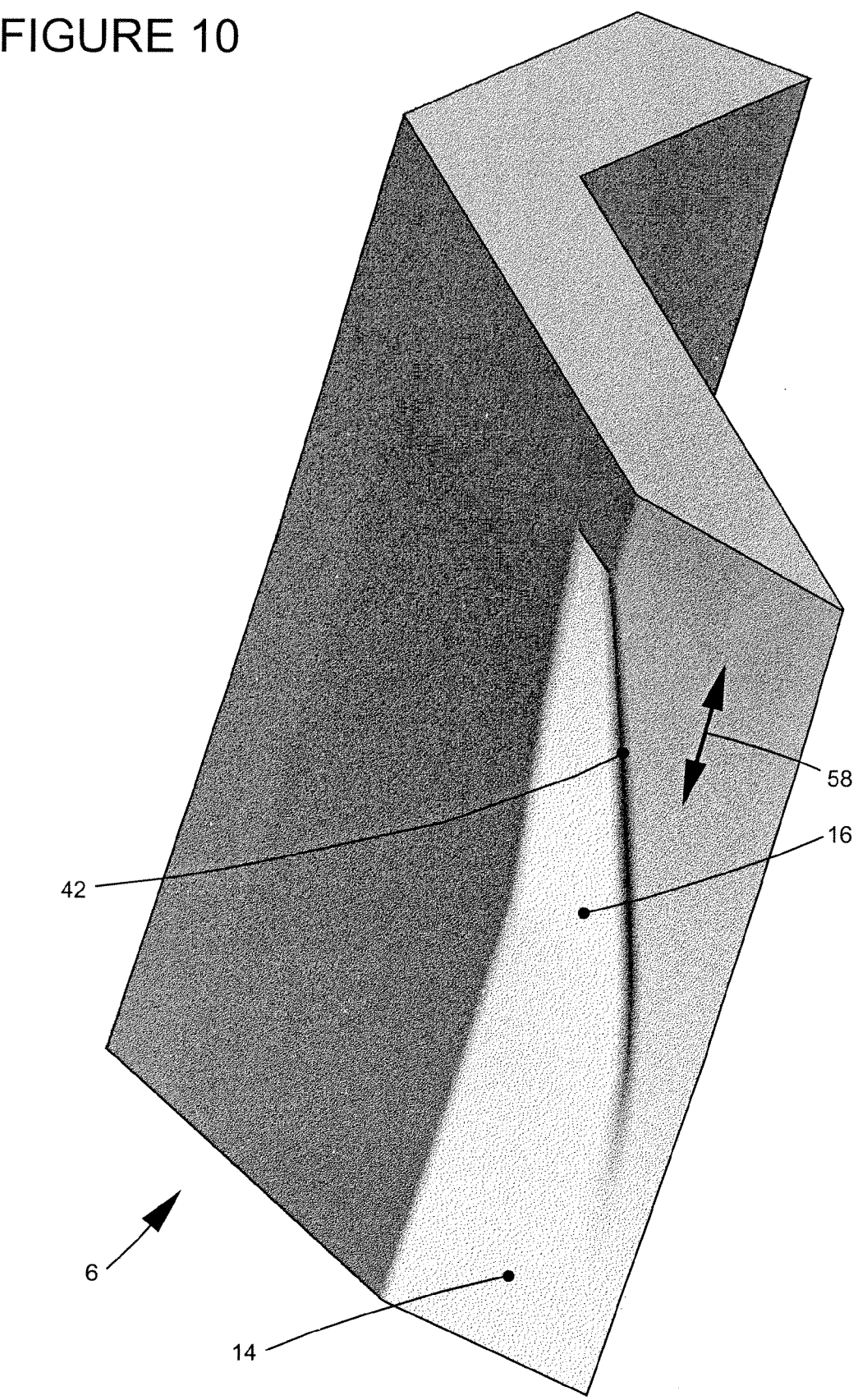

FIG. 1L is a fragmentary cross-sectional view of a rotary sealing assembly including a rotary seal and backup ring according to still another preferred embodiment of the present invention;

FIG. 1M is a fragmentary cross-sectional view of a rotary sealing assembly including a rotary seal and backup ring according to still another preferred embodiment of the present invention;

FIG. 1N is a fragmentary cross-sectional view of a portion of a rotary sealing assembly including a backup ring and hydrodynamic recess according to a preferred embodiment of the present invention;

FIG. 1P is a fragmentary cross-sectional view of a rotary seal and backup ring according to a preferred embodiment of the present invention where the rotary seal is a lip seal;

FIG. 1Q is a fragmentary cross-sectional view of a rotary seal and backup ring according to another preferred embodiment of the present invention where the rotary seal is a lip seal;

FIG. 1R is a fragmentary cross-sectional view of a rotary seal and backup ring according to yet another preferred embodiment of the present invention where the rotary seal is a lip seal;

FIG. 2 is a fragmentary cross-sectional view of a portion of a rotary sealing assembly according to a preferred embodiment of the present invention before a differential pressure is applied, where the hydrodynamic recess is manufactured and the dynamic surface of the backup ring includes a protrusion;

FIG. 2A is a fragmentary cross-sectional view of a portion of the rotary sealing assembly of FIG. 2 after a differential pressure is applied;

FIG. 3 is a fragmentary cross-sectional view of a portion of a rotary sealing assembly according to a preferred embodiment of the present invention before a differential pressure is applied, where the hydrodynamic recess is not manufactured and the dynamic surface of the backup ring includes a protrusion;

FIG. 3A is a fragmentary cross-sectional view of a portion of the rotary sealing assembly of FIG. 3 after a differential pressure is applied;

FIG. 4 is a fragmentary cross-sectional view of a portion of a rotary sealing assembly according to a preferred embodiment of the present invention before a differential pressure is applied, where the hydrodynamic recess is manufactured;

FIG. 4A is a fragmentary cross-sectional view of a portion of the rotary sealing assembly of FIG. 4 after a differential pressure is applied;

FIG. 5 is a fragmentary cross-sectional view of a portion of a rotary sealing assembly according to a preferred embodiment of the present invention before a differential pressure is applied, where the hydrodynamic recess is manufactured and the backup ring includes a protrusion on the dynamic surface and a weakening recess;

FIG. 5A is a fragmentary cross-sectional view of a portion of the rotary sealing assembly of FIG. 5 after a differential pressure is applied;

FIG. 6 is a fragmentary cross-sectional view of a portion of a rotary sealing assembly according to a preferred embodiment of the present invention before a differential pressure is applied, where the hydrodynamic recess is not manufactured and the backup ring includes a weakening recess;

FIG. 6A is a fragmentary cross-sectional view of a portion of the rotary sealing assembly of FIG. 6 after a differential pressure is applied;

FIG. 7 is a fragmentary cross-sectional view of a portion of a rotary sealing assembly according to a preferred embodiment of the present invention before a differential pressure is applied, where the hydrodynamic recess is manufactured and the backup ring includes a weakening recess;

FIG. 7A is a fragmentary cross-sectional view of a portion of the rotary sealing assembly of FIG. 7 after a differential pressure is applied;

FIG. 8 is a perspective view of a portion of the rotary seal and the backup ring of a preferred embodiment of the present invention in an uninstalled condition and including an anti-rotation extension;

FIG. 9 is a perspective view of a portion of the backup ring of a preferred embodiment of the present invention in an uninstalled condition;

FIG. 10 is a perspective view of a portion of the backup ring according to a preferred embodiment of the present invention in an uninstalled condition where the backup ring includes a unidirectional type of hydrodynamic recess.

DESCRIPTION OF THE PREFERRED EMBODIMENTS

Features throughout this specification that are represented by like numbers have the same function. Referring now to the drawings and first to FIG. 1, a fragmentary transverse cross-sectional view of a rotary assembly is shown generally at 2 at a greatly enlarged scale.

The rotary assembly 2 incorporates a relatively rotatable member 4 that is relatively rotatable with respect to a backup ring 6. The backup ring is positioned in supporting engagement with a rotary seal 8. (The cross-sectional illustration of the backup ring 6 is broken away at one location to make a portion of the rotary seal 8 visible.). A dynamic sealing surface 10 of the rotary seal 8 is held in sealing engagement with a relatively rotatable surface 12 of the relatively rotatable member 4.

By "transverse cross-sectional view," what is meant throughout this specification is the imaginary cutting plane of the cross-sectional view is oriented at right angles to the theoretical axis of the relatively rotatable surface 12 of the relatively rotatable member 4. While the theoretical axis is not illustrated to save space and permit an enlarged drawing view, the term "axis" is well-understood in mechanical engineering, and in the field of drafting is sometimes illustrated using a centerline in longitudinal cross-sectional views, and is sometimes illustrated using intersecting centerlines in transverse cross-sectional views. In the present invention, the aforementioned axis is preferably also the axis of relative rotation between the relatively rotatable surface 12 and the backup ring 6.

The backup ring 6 and rotary seal 8 have a generally ring-like configuration. However the backup ring 6 may be scarf cut or otherwise split, if desired, for ease of installation. The terms "ring-like" and "ring" are used with the understanding that the term "ring" is commonly understood to encompass shapes other than the perfectly circular. As an example, a decorative finger ring often has beaded edges or a sculpted shape, yet is still called a ring. As another example, the "ring" of Lewis F. Korns' U.S. Pat. No. 1,462,205 is not everywhere circular. There are thousands of precedents for using the term "ring-like" in a patent, and many patents use the term in conjunction with a seal or a body of a seal. For example, see U.S. Pat. Nos. 612,890, 4,361,332, 4,494,759, 4,610,319, 4,660,839, 4,909,520, 5,029,879, 5,230,520, 5,584,271, 5,678,829, 5,833,245, 5,873,576, 6,109,618, and 6,120,036. Note that in many of the examples, the item in question has features that result in the shape not being everywhere circular; for example, in some cases the dynamic lip of a ring-like seal has a wavy flank shape.

The rotary seal 8 may be composed of any suitable sealing material, including elastomeric or rubber-like materials such as an elastomer compound or a combination of one or more elastomer compounds, and including various plastic materials, and including different materials bonded together to form a composite structure or inter-fitted together, and including a combination of a suitable plastic and an elastomer compound; and including fabric reinforced elastomer.

It is commonly understood by those having ordinary skill in the art that elastomers used in seal construction are compounds that include one or more base elastomers. Such base elastomers include, but are not limited to, HNBR (hydrogenated nitrile), HSN (highly saturated nitrile), FKM (fluorocarbon rubber), FEPM (also known as TFE/P or Tetrafluoroethylene and Propylene Copolymer), and EPDM. Such compounds may include other compounding agents including fillers, processing aids, anti-degradants, vulcanizing agents, accelerators and activators. The effects of the ingredients used are generally understood by those of ordinary skill in the art of compounding elastomers. Likewise, the ingredients used in manufacturing plastics that are used in sealing applications are generally understood by those of ordinary skill in the art of developing plastic materials.

Throughout this specification, the portion of the backup ring 6 that can contact the relatively rotatable surface 12 is preferably made from a material having a greater modulus of elasticity than the modulus of elasticity of the portion of the rotary seal 8 which is in contact with the relatively rotatable surface 12. Examples (but not an exhaustive list) of candidate materials for the portion of the backup ring 6 that is in contact with the relatively rotatable surface 12 are: PolyEtherEtherKetone (also known as "PEEK"), reinforced PTFE, a mixture of PEEK and PTFE (i.e. "Soft PEEK"), acetal polyoxymethylene (also known by the Dupont Trademark "Delrin"), and various metals such as, but not limited to, beryllium copper, bearing bronze, and steel. Bearing material compositions can also be employed, such as silver infiltrated sintered bronze, and metal-polymer materials such as sintered bronze impregnated with a polymer such as a PTFE-based polymer.

A primary purpose of the backup ring 6 is to support the rotary seal 8 against differential pressure that may be acting across the rotary seal 8, in order to prevent or minimize extrusion damage of the rotary seal 8 and to improve interfacial lubrication of rotary seal 8. In its relaxed state, surface 14 of the backup ring 6 can be larger than the relatively rotatable surface 12 of the relatively rotatable member 4 for ease of assembly.

Applied force preferably causes portions of surface 14 of the backup ring 6 to contact the relatively rotatable surface 12, such that surface 14 functions as a dynamic surface and establishes one or more contact footprints with the relatively rotatable surface 12. This applied force is preferably the result of differential pressure acting across the rotary seal 8, however the applied force can also conceivably be generated in other less desirable ways, such as by elastically stretching the backup ring onto the shaft.

The backup ring 6 is preferably configured to be pressure responsive. When differential pressure acts across the rotary seal 8 from the side opposite the backup ring 6, at least a portion of the resulting force is transferred from the rotary seal 8 to the backup ring 6. This applied force acts on one or more force receiving surfaces of the backup ring 6, causing surface 14 of the backup ring 6 to move toward the relatively rotatable surface 12.

Surface 14 of the backup ring 6 has one or more hydrodynamic recesses 16, such that at least some portions of surface 14 have slightly wavy shape. In other words, portions of surface 14 vary in spacing from the relatively rotatable surface 12. When a sufficient level of differential pressure acts across the rotary seal 8, portions of surface 14 of the backup ring 6 contact the relatively rotatable surface 12 of the relatively rotatable member 4.

Each of the hydrodynamic recesses 16 provides a local clearance region 18 between the backup ring 6 and the relatively rotatable surface 12 of the relatively rotatable member 4. Each hydrodynamic recess 16 preferably has gradual convergence with the relatively rotatable surface 12 in at least one circumferential direction. In FIG. 1, the hydrodynamic recess 16 has the appearance of an undulation, and has gradual convergence with the relatively rotatable surface 12 in both circumferential directions. The purpose of the gradual convergence is to provide a hydrodynamic wedge shape for promotion of hydrodynamic lubrication in response to relative rotation between the backup ring 6 and the relatively rotatable surface 12 of the relatively rotatable member 4. The lubrication is introduced into the contact footprint region or regions between the backup ring 6 and the relatively rotatable surface 12.

It is to be understood that this relative rotation can be achieved by rotating the relatively rotatable surface 12, or by rotating the backup ring 6, or by simultaneously rotating both the relatively rotatable surface 12 and the backup ring 6. The rotary seal 8 and the backup ring 6 preferably do not rotate relative to one another.

The portion of the relatively rotatable surface 12 that is aligned with the clearance region 18 of the hydrodynamic recess 16 is exposed to a lubricant 20 and is wetted by the lubricant 20. When the relatively rotatable surface 12 has relative rotation with respect to the backup ring 6, the rotational velocity drags lubricant past the aforementioned (and illustrated) gradual convergence, and into the dynamic interface between surface 14 of the backup ring 6 and the relatively rotatable surface 12 of the relatively rotatable member 4. This hydrodynamic wedging action provides lubrication within the dynamic interface, minimizing friction between the backup ring 6 and the relatively rotatable surface 12, minimizing heat generation, and minimizing wear of the backup ring 6 and the relatively rotatable surface 12.

The radial clearance between the backup ring 6 and the relatively rotatable surface 12 at the clearance region 18 is very small, and thereby minimizes or eliminates pressure-induced extrusion of the rotary seal 8. If the rotary seal 8 is a hydrodynamic seal, the very small radial clearance provided by the backup ring 6 also improves the interfacial lubrication between the rotary seal 8 and the relatively rotatable surface 12. The dimension of the clearance region 18 need not be constant throughout the length of the backup ring 6. It is preferred that the dimension of the clearance region become smaller near the rotary seal 8. In some cases the clearance dimension can drop to essentially zero at the rotary seal 8, the clearance being only that microscopic clearance provided by a lubricant film located between the backup ring 6 and the relatively rotatable surface 12.

The one or more hydrodynamic recesses 16 are provided and/or maintained by one or more of the features listed as follows:

Manufactured recesses.

Local projections 22 extending from surface 14 of the backup ring 6 that form and/or prop open the hydrodynamic recess 16.

Local weakening recesses 24 within the backup ring 6, allowing flexure as surface 14 of the backup ring 6 is forced into contact with the relatively rotatable surface 12 of the relatively rotatable member 4, wherein the flexure forms or helps to sustain the hydrodynamic recess 16.

In FIG. 1, all three geometries are present, and function in a cooperative manner, although any one of the geometries is by itself capable of producing the hydrodynamic recess 16 and the gradual convergence that is necessary to produce hydrodynamic interfacial lubrication in response to relative rotation between the relatively rotatable surface 12 and the backup ring 6. The local weakening recesses 24 need not pass completely through the backup ring 6. Other specific shapes of the local weakening recess 24 are possible without departing from the spirit or scope of the invention.

FIGS. 1A to 1R

FIGS. 1A to 1Q are fragmentary longitudinal cross-sectional views that show various ways to configure the aforementioned one or more force receiving surfaces of the backup ring 6 so that force resulting from differential pressure acting across the rotary seal 8 causes portions of surface 14 of the backup ring 6 to move toward and into contact with the relatively rotatable surface 12 of the relatively rotatable member 4. The relatively rotatable surface 12 can have a generally cylindrical form, such as the outer surface of a shaft or sleeve, or the surface of a bore. The relatively rotatable surface 12 can also take the form of a generally cylindrical bore, or a plane. (In the typically encountered application, the relatively rotatable surface 12 is the cylindrical external surface of a shaft or a shaft sleeve, as illustrated in FIG. 1).

The purpose of the rotary seal 8 is to establish sealing between a machine component 26 and the relatively rotatable surface 12 of the relatively rotatable member 4, in order to retain the pressure of a fluid 28 which may be greater than the pressure of the lubricant 20. For the purposes of this specification, the term "fluid" has its broadest meaning, encompassing both liquids and gases.

Preferably, at least a portion of the backup ring 6 is supported and located by a structural surface 30 of the machine component 26. The purpose of the backup ring 6 is to cover up and bridge the extrusion gap 27 (i.e. clearance) that is present between the machine component 26 and the relatively rotatable surface 12 of the relatively rotatable member 4, to support the rotary seal 8 and thereby enable the rotary seal 8 to withstand high differential pressure between the fluid 28 and the lubricant 20.

Although the rotary seal 8 and backup ring 6 are shown to be located by a groove within a machine component 26 of one piece construction, such is not intended to limit the spirit or scope of the invention. Various ways are known in the prior art for locating/positioning a seal. For example, the machine component 26 could split to facilitate insertion of the rotary seal 8 and/or backup ring 6. One way to achieve the split would be to employ a conventional removable gland wall. For another example, it is possible to locate a rotary seal by clamping portion of the rotary seal between two components that comprise the machine component 26.

For orientation purposes, it should be understood that in all of the longitudinal cross-sectional views herein, the cutting plane of the cross-section is aligned with and passes through the theoretical axis of rotation of the relatively rotatable surface 12; i.e., the theoretical centerline lies on the cutting plane. The circumferential direction of relative rotation is normal (perpendicular) to the plane of the cross-section (i.e. normal to the printed page).

The rotary seal 8 typically includes a dynamic lip 48 of generally annular form which incorporates the dynamic sealing surface 10. The rotary seal 8 is illustrated as a direct compression seal that is compressed between the machine component 26 and the relatively rotatable surface 12, but such is not intended to limit the spirit or scope of the invention.

As shown by FIGS. 1A, 1B, 1C, 1D, 1E, 1G, and 1J, if desired, one or more local recesses 32 may be incorporated into a surface of the backup ring 6 for anti-rotation purposes, such as but not limited to the shallow spot-faces that are illustrated. When the pressure of the fluid 28 is greater than the pressure of the lubricant 20, the resulting differential pressure drives sealing material from the rotary seal 8 into the local recesses 32, producing local projections of seal material that interlock with the local recesses 32, thereby inhibiting relative rotation between the backup ring 6 and the rotary seal 8. Alternately, the rotary seal 8 can be formed with projections that engage the local recesses 32 even in the absence of differential pressure, or the backup ring 6 could have projections that engage recesses in the rotary seal 8.

In FIGS. 1A, 1B, 1C, 1D, 1F, 1G, 1H, 1J, 1K, 1L, 1M, 1P, 1Q, and 1R, resilient energizing material 34 engages one or more energizing surface 36 of the backup ring 6. The pressure of the fluid 28 is propagated through the resilient sealing material of the rotary seal 8 as if the resilient sealing material was a fluid, and also propagates through the resilient energizing material 34 as if the resilient energizing material 34 were a fluid. If the pressure of the fluid 28 is greater than the pressure of the lubricant 20, the pressure propagating through the resilient energizing material 34 imparts force which acts on the one or more energizing surface 36, causing portions of surface 14 of the backup ring 6 to move toward and into contact with the relatively rotatable surface 12 of the relatively rotatable member 4, as described previously in conjunction with FIG. 1.

In FIGS. 1A, 1C, 1K, 1L, 1P, 1Q, and 1R, the resilient energizing material 34 is integral with the rotary seal 8, and overhangs the backup ring 6.

In FIGS. 1B, 1D, 1F, 1G, 1H, 1J, and 1M, the resilient energizing material 34 is separate from the rotary seal 8, projects into or over the backup ring 6, and may if desired be made an integral part of the backup ring via bonding or other suitable retention means.

FIG. 1B illustrates an anti-rotation extension 44 with an enlarged embedded head 46 that engages a mating anti-rotation recess 47 in the machine component 26, in order to prevent spinning of the backup ring 6 relative to the machine component 26. The enlarged head 46 prevents extrusion of the backup ring 6 into the recess 47.

In FIG. 1E, the structural surface 30 of the machine component 26 and the mating energizing surface 36 of the backup ring 6 are sloped. The pressure of the fluid 28 is propagated through the resilient sealing material of the rotary seal 8 as if the resilient sealing material were a fluid, producing an axially acting hydraulic force which forces the energizing surface 36 of the backup ring 6 into contact with the sloped structural surface 30 of the machine component 26. A component of the axially acting hydraulic force acts on the energizing surface 36 of the backup ring 6, causing portions of surface 14 of the backup ring 6 to move toward and into contact with the relatively rotatable surface 12 of the relatively rotatable member 4.

In FIGS. 1A, 1B, 1J, 1M, and 1R the energizing surface 36 of the backup ring 6 is generally parallel to the relatively rotatable surface 12 of the relatively rotatable member 4. In FIGS. 1C, 1D, 1E, 1H, 1L, 1P, and 1Q, the energizing surface 36 of the backup ring 6 is generally conical, and making energizing surface 36 sloped relative to the relatively rotatable surface 12 of the relatively rotatable member 4. In FIGS. 1F, 1G, and 1K, the energizing surface 36 of the backup ring 6 is comprised of both generally parallel and generally conical/sloped surfaces.

If desired, in FIGS. 1A to 1M, the lip flank 40 can be wavy, for hydrodynamically wedging lubricant into the interface between the dynamic sealing surface 10 and the relatively rotatable surface 12 of the relatively rotatable member 4 in response to relative rotation between the rotary seal 8 and the relatively rotatable surface 12. The intersection between the dynamic sealing surface 10 and the lip flank 40 is preferably blended by a curve 62, so that the curve 62 can serve as a hydrodynamic inlet for lubrication of the dynamic sealing surface 10 during periods of relative rotation between the rotary seal 8 and the mating relatively rotatable surface 12 of the relatively rotatable member 4. This helps to minimize wear of the dynamic sealing surface 10 and the relatively rotatable surface 12. If the lip flank 40 is wavy, when the dynamic lip 48 of the rotary seal 8 deforms against the relatively rotatable surface, it establishes an interfacial contact footprint that varies in width from place to place.

FIG. 1G shows the backup ring as having a projection 15 that engages with a seal recess 17 to prevent spinning between the rotary seal 8 and the backup ring 6.

In FIG. 1H, the energizing material 34 is employed in recesses on both sides of the backup ring 6, and the backup ring has hinge sections 9 which permit the backup ring to expand to fit the space between the relatively rotatable surface 12 and a peripheral wall 11 of the machine component 26. The rotary seal 8 is compressed between the peripheral wall 11 and the relatively rotatable surface 12.

FIG. 1J illustrates an anti-rotation extension 44 extending from he machine component 26 and engaging a mating anti-rotation recess 47 in the backup ring 6, in order to prevent spinning of the backup ring 6 relative to the machine component 26. If desired, the recess 47 can be formed within a reinforcing insert 49.

As shown by FIG. 1L, a backup ring 6 can be located on both sides of the rotary seal 8, to minimize extrusion damage to the rotary seal 8 regardless of the direction of differential pressure acting across the rotary seal 8. FIG. 1L illustrates differential pressure acting from left to right, and causing the right-hand backup ring 6 to contact the relatively rotatable surface 12. As also shown by the hidden lines of FIG. 1L, the energizing surface 36 of the backup ring 6 can be wavy, so that the lip flank 40 is maintained in a wavy configuration, for hydrodynamically wedging lubricant into the interface between the dynamic sealing surface 10 and the relatively rotatable surface 12 of the relatively rotatable member 4 in response to relative rotation between the rotary seal 8 and the relatively rotatable surface 12.

FIG. 1N is an enlargement showing that the surface of the hydrodynamic recess 16 of the backup ring 6 need not be parallel to the relatively rotatable surface 12 of the relatively rotatable member 4. If the surface of the hydrodynamic recess 16 comes closer to the relatively rotatable surface 12 as it nears the rotary seal 8, the reduced clearance near the rotary seal 8 is beneficial to the rotary seal 8 because a smaller clearance leads to less extrusion damage to the rotary seal 8. If rotary seal 8 is a hydrodynamic seal, smaller clearance also improves the lubricant film thickness between the dynamic sealing surface 10 of the rotary seal 8 and the relatively rotatable surface 12 of the relatively rotatable member 4. For orientation purposes, the structural surface 30 of machine component 26 is shown.

The seals in FIGS. 1 to 1H and 1J to 1M are illustrated as being direct compression seals.

The seals in FIGS. 1P to 1R are illustrated as being lip type seals; and more specifically are illustrated as packing, where differential pressure energizes the dynamic lip 48 against the relatively rotatable surface 12. The seal and backup ring combinations shown in FIGS. 1P to 1R are particularly suitable for use in rotary swivel assemblies, such as the general type of oilfield washpipe assemblies that are described in U.S. Pat. No. 2,764,428 "Wash pipe mounting for swivels", IADC/SPE Paper 59107 "A New Hydrodynamic Washpipe Sealing System Extends Performance Envelope and Provides Economic Benefit", and commonly assigned U.S. Pat. No. 6,007,105 "Swivel seal assembly". As shown by FIG. 1P, the backup washer can have a v-shape when viewed in cross-section, for being supported by mating v-shaped structural surface 30.

In general, the term "packing" simply refers to a sealing ring that is intended to be used in a "stuffing box" of one sort or another. "Packing" and "stuffing box" are terms that date back to the 1770's, and perhaps earlier. A stuffing box is housing with a deep cylindrical cavity that receives a plurality of packing rings. Some or all of the packing rings are often installed in abutting relation with spacer rings that perform a packing ring supporting function. For several examples of spacer/support rings, see U.S. Pat. Nos. 2,394,800, 2,442, 687, and 2,459,472, and IADC/SPE Paper 59107.

The backup ring 6 and rotary seal 8 in FIGS. 1P to 1R are preferably clamped axially between first and second machine components 26A and 26B. This clamping action prevents rotation of the backup ring 6 and rotary seal 8 relative to the first and second machine components 26A and 26B.

The first and second machine components 26A and 26B may be retained or attached together by any suitable retaining or attachment means, including threaded means such as threads, bolts, screws, studs, hammer unions, etc, and including external clamping means, bayonet-type latches, deformable rims or tangs, retaining ring(s), welding, soldering, bonding, friction, interference fit, etc. without departing from the spirit or scope of the invention. The first and second machine components 26A and 26B may be made from any suitable material, such as metal, plastic or reinforced plastic, or a combination thereof.

The most common method for securing the first and second machine components 26A and 26B together is to axially clamp them inside of a housing, as shown in U.S. Pat. No. 2,394,800 and FIG. 11 of IADC/SPE Paper 59107. As shown in U.S. Pat. No. 2,394,800, and FIG. 11 of IADC/SPE Paper 59107, the first and second machine components 26A and 26B may if desired incorporate one or more lubricant communication passages such as drilled holes. If desired, the first and second machine components 26A and 26B can have a sealed relationship with a mating housing.

Overview of the Common Features of FIGS. 2 to 7A

FIGS. 2 and 2A, 3 and 3A, 4 and 4A, 5 and 5A, 6 and 6A, and 7 and 7A show transverse fragmentary cross-sectional views of six different embodiments of the present invention. In each of these embodiments, one or more of the aforementioned selectable geometries are absent. In each of these figures, a rotary assembly is shown at 2 at a greatly enlarged scale. Each numbered pair of figures shows a particular embodiment before and after differential pressure is applied. The numbered pairs are identified by the following table:

| Before differential pressure is applied | After differential pressure is applied |
| --- | --- |
| FIG. 2 | FIG. 2A |
| FIG. 3 | FIG. 3A |
| FIG. 4 | FIG. 4A |
| FIG. 5 | FIG. 5A |
| FIG. 6 | FIG. 6A |
| FIG. 7 | FIG. 7A |

In FIGS. 2 to 7A, the rotary assembly 2 incorporates a relatively rotatable member 4 that is relatively rotatable with respect to a backup ring 6. The backup ring 6 is in supporting engagement with a rotary seal 8. (The cross-sectional illustration of the backup ring 6 is broken away at one location to make a portion of the rotary seal 8 visible.) A dynamic sealing surface 10 of the rotary seal 8 is held in sealing engagement with a relatively rotatable surface 12 of the relatively rotatable member 4.

The portion of the backup ring 6 that contacts the relatively rotatable surface 12 is preferably made from a material having a greater modulus of elasticity than the modulus of elasticity of the portion of the rotary seal 8 which is in contact with the relatively rotatable surface 12.

The purpose of the backup ring 6 is to support the rotary seal 8 against differential pressure that may be acting across the rotary seal 8, in order to prevent or minimize extrusion damage of the rotary seal 8, and in order to facilitate lubrication between the rotary seal 8 and the relatively rotatable surface 12 by reducing interfacial contact pressure between the rotary seal 8 and the relatively rotatable surface 12.

As shown by FIGS. 2, 3, 4, 5, 6, and 7, before differential pressure is applied, surface 14 of the backup ring 6 can be larger than the relatively rotatable surface 12 of the relatively rotatable member 4 for ease of assembly. As also shown by FIGS. 2, 4, and 7, preferably at least one end the hydrodynamic recess 16 merges/blends smoothly into the circumferentially adjacent portion of surface 14. This smooth transition from the hydrodynamic recess 16 to the circumferentially adjacent portion of surface 14 is preferable because it facilitates hydrodynamic wedging activity in response to relative rotation between the backup ring and the relatively rotatable surface 12.

The backup ring 6 is configured to be pressure responsive. When differential pressure acts across the rotary seal 8 from the side opposite the backup ring 6, at least a portion of the resulting hydraulic force is transferred from the rotary seal 8 to the backup ring 6, acting on one or more force receiving surfaces of the backup ring 6, and causing surface 14 of the backup ring 6 to move toward the relatively rotatable surface 12. (When the relatively rotatable surface 12 is generally cylindrical, surface 14 changes diameter in order to move toward the relatively rotatable surface 12.).

As shown by FIGS. 2A, 3A, 4A, 5A, 6A, and 7A, when a sufficient level of differential pressure acts across the rotary seal 8, portions of surface 14 of the backup ring 6 contact the relatively rotatable surface 12 of the relatively rotatable member 4, and the backup ring 6 has one or more hydrodynamic recess 16 that provides a local clearance region 18 between the backup ring 6 and the relatively rotatable surface 12 of the relatively rotatable member 4. Each hydrodynamic recess 16 preferably has gradual convergence with the relatively rotatable surface 12 in at least one circumferential direction. In FIGS. 2A, 3A, 4A, 5A, 6A, and 7A, the hydrodynamic recess 16 has gradual convergence with the relatively rotatable surface 12 in both circumferential directions. The purpose of the gradual convergence is to provide a hydrodynamic wedge shape for promotion of hydrodynamic lubrication within the contact footprint region or regions between the backup ring 6 and the relatively rotatable surface 12. In other words, the backup ring 6 slips or hydroplanes on a film of lubricating fluid during periods of relative rotation between the backup ring 6 and the relatively rotatable surface 12.

Any portion of the relatively rotatable surface 12 that is aligned with the clearance region 18 is exposed to and wetted by the lubricant 20. When the relatively rotatable surface 12 has relative rotation with respect to the backup ring 6, the rotational velocity drags lubricant past the aforementioned (and illustrated) gradual convergence, and into the dynamic interface/footprint between surface 14 of the backup ring 6 and the relatively rotatable surface 12 of the relatively rotatable member 4. This hydrodynamic wedging action provides lubrication within the dynamic interface, minimizing friction between the backup ring 6 and the relatively rotatable surface 12 of the relatively rotatable member 4, minimizing heat generation, and minimizing wear of the backup ring 6 and the relatively rotatable surface 12.

The radial clearance between the backup ring 6 and the relatively rotatable surface 12 at the clearance region 18 is very small, and thereby minimizes or eliminates pressure-induced extrusion of the rotary seal 8.

FIGS. 2 and 2A

In the embodiment of FIGS. 2 and 2A, the weakening recess of FIG. 1 is absent, but the manufactured hydrodynamic recess 16 and the projection 22 are both present. The projection 22 props the hydrodynamic recess 16 open, inhibiting pressure-induced collapse of the hydrodynamic recess 16.

FIGS. 3 and 3A

In the embodiment of FIGS. 3 and 3A, the weakening recess and the manufactured hydrodynamic recess of FIG. 1 are absent, but the projection 22 is present. The projection 22 forms the hydrodynamic recess 16 when differential pressure forces portions of surface 14 of the backup ring 6 toward the relatively rotatable surface 12 of the relatively rotatable member 4. Because of the support provided by the projection 22, surface 14 of the backup ring 6 deforms to produce a hydrodynamic recess 16 that has the general appearance of an undulation.

FIGS. 4 and 4A

In the embodiment of FIGS. 4 and 4A, the weakening recess and projection of FIG. 1 are absent, but the manufactured hydrodynamic recess 16 is present before and after differential pressure is applied across the rotary seal 8. Although the differential pressure changes the shape of the hydrodynamic recess 16, the hydrodynamic recess 16 is sized so that it does not flatten completely against the relatively rotatable surface 12 of the relatively rotatable member 4, and the gradual convergence necessary for hydrodynamic interfacial lubrication is preserved. As shown by FIG. 4, the manufactured hydrodynamic recess causes portions of surface 14 to be non-parallel to the relatively rotatable surface 12 even before differential pressure is applied.

FIGS. 5 and 5A

In the embodiment of FIGS. 5 and 5A, the manufactured hydrodynamic recess of FIG. 1 is absent, but the weakening recess 24 and the projection 22 are both present. The weakening recess 24 need not extend completely though the backup ring 6. The projection 22 forms the hydrodynamic recess 16 when differential pressure forces portions of surface 14 of the backup ring 6 toward the relatively rotatable surface 12 of the relatively rotatable member 4. The weakening recess facilitates the flexure that is necessary for the hydrodynamic recess 16 to form.

FIGS. 6 and 6A

In the embodiment of FIGS. 6 and 6A, the projection 22 and manufactured hydrodynamic recess 16 of FIG. 1 are absent, but the weakening recess 24 is present. The weakening recess 24 allows the shape of the hydrodynamic recess 16 to form as a result of differential pressure induced radial load. The shape of the hydrodynamic recess 16 varies as a function of differential pressure induced radial load, and hydrodynamic film production.

FIGS. 7 and 7A

In the embodiment of FIGS. 7 and 7A, the projection 22 of FIG. 1 is absent, but the manufactured hydrodynamic recess 16 and the weakening recess 24 are both present. The weakening recess 24 allows the shape of the hydrodynamic recess 16 to vary as a function of differential pressure induced radial load, and hydrodynamic film production.

FIG. 8

FIG. 8 shows a view of a rotary seal 8 and a backup ring 6 in the uninstalled condition. The resilient energizing material 34 of the rotary seal 8 has local projections 38 which interlock with local recesses 32 of the backup ring 6 to prevent rotation between the rotary seal 8 and the backup ring 6.

FIG. 8 also illustrates an anti-rotation extension 44 with an enlarged embedded head 46. Such an anti-rotation extension 44 could engage a mating recess in the mating structural surface of the machine component, in order to prevent spinning of the backup ring 6 relative to the machine component.

In FIG. 8, a static sealing lip 50 is oriented in generally opposed relation to the dynamic lip 48. FIG. 8 also shows weakening recesses 24 which do not project completely through the backup ring 6, and a lip flank 40 which may be wavy. The intersection between the dynamic sealing surface 10 and the lip flank 40 is preferably blended by a curve 62, on that the curve 62 can serve as a hydrodynamic inlet for lubrication of the dynamic sealing surface 10 during periods of relative rotation between the rotary seal 8 and the mating relatively rotatable surface of a relatively rotatable member. For orientation purposes, the dynamic sealing surface 10 of the rotary seal 8 and surface 14 of the backup ring 6 are identified.

When force (produced by differential pressure acting across the rotary seal 8) is applied to the backup ring 6, the load is primarily reacted to the mating relatively rotatable surface by the unweakened support regions 25 that exist between the weakened recesses 24. This loading through the support regions 25 causes the portions of surface 14 near the weakened recesses 24 to flex slightly away from the mating relatively rotatable surface. This elastic flexing at the less well supported regions near the weakening recesses 24 creates undulations in surface 14, forming hydrodynamic recesses that create an initial hydrodynamic fluid wedge with respect to the corresponding relatively rotatable mating surface. The gradually converging geometry created by these undulations promotes a strong hydrodynamic action that wedges a lubricant film of a predictable magnitude into the dynamic interface between the backup ring and the mating relatively rotatable surface in response to relative rotation. This lubricant film physically separates the dynamic surfaces of the backup ring and the relatively rotatable surface from each other, thus minimizing asperity contact, and reducing friction, wear and backup ring-generated heat, while permitting operation at higher differential pressure and speed combinations than would otherwise be possible with a non-hydrodynamic backup ring.

If desired, a lubricant passage 70 can communicate lubricant to the region where the hydrodynamic recess is or will be found. On the left hand side of FIG. 8, a drilled hole forms part of the lubricant passage 70, and the weakening recess 24 forms part of the overall lubricant passage 70. If desired, the machine component (not shown) can also form a continuation of the lubricant passage. On the right hand side of FIG. 8, a slot forms the lubricant passage 70.

FIG. 9

FIG. 9 shows a backup ring generally at 6. The backup ring 6 incorporates three rows of formed hydrodynamic recesses. The hydrodynamic recesses 16A and 16C in a first row 52 are out of sync with the hydrodynamic recess 16B in the middle row 54, so that the high points (between the hydrodynamic recesses) of the first row 52 support the hydrodynamic recesses of the middle row 54. Similarly, the hydrodynamic recesses 16A' and 16C' of the third row 56 are out of sync with the hydrodynamic recess 16B in the middle row 54. Any number of such mutually supportive rows of hydrodynamic recess can be employed. The radial dimensions of the undulating hydrodynamic recesses are exaggerated for clarity. Shoulders 42A, 42B, and 42C are located next to the hydrodynamic recesses 16A, 16B, and 16C respectively, supporting the recesses against differential pressure induced collapse.

FIG. 9 also shows a local recess 32 incorporated into a surface of the backup ring 6 for engaging the rotary seal for anti-rotation purposes (as previously described).

FIG. 10

FIG. 10 shows a backup ring generally at 6 which incorporates a unidirectional type of hydrodynamic recess 16. One end of the hydrodynamic recess 16 blends smoothly with the remainder of surface 14, while the other end is supported by shoulder 42 which has a shelf-like appearance, and is skewed with respect to the possible directions of relative rotation 58. The hydrodynamic recess 16 provides the gradual convergence, efficient impingement angle, and gradual interfacial contact pressure rise in the circumferential direction that are conducive to efficient hydrodynamic wedging activity.

The shoulder 42 helps to prevent the hydrodynamic recess 16 from collapsing completely against the relatively rotatable surface when the differential pressure acting across the rotary seal is high. The lubricant is swept into the dynamic interface between the backup ring 6 and the relatively rotatable mating surface by the gentle convergence provided by one end of the hydrodynamic recess 16.

The shoulder 42 also creates a skewed zone of locally increased interfacial contact pressure within the contact footprint that preferably diverts lubricant film ensuring lubrication of the entire width of the dynamic interface between the backup ring 6 and the relatively rotatable surface. The skewed elevated contact pressure zones are produced by compression edge effects provide for controlled lubricant movement within the dynamic sealing interface between the backup ring 6 and the mating relatively rotatable surface, producing hydrodynamic lubrication and low running torque.

The backup ring of FIG. 10 is illustrated as being v-shaped in cross-section, which would be appropriate for supporting seals such as packings which have a V-shaped surface.

Conclusion

In view of the foregoing it is evident that the present invention is one that is well adapted to attain all of the objects and features hereinabove set forth, together with other objects and features which are inherent in the apparatus disclosed herein.

Even though several specific geometries are disclosed in detail herein, many other geometrical variations employing the basic principles and teachings of this invention are possible. The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim

1. A rotary sealing assembly, comprising:
   first and second machine components defining an annular groove comprising a first surface, a structural surface, and at least one radially inward facing peripheral surface, said first surface facing said structural surface of said annular groove;
   a relatively rotatable member defining a relatively rotatable external surface of generally cylindrical form located at least partially within said second machine component and separated from said second machine component by an extrusion gap;
   a rotary seal at least partially received in said annular groove, said rotary seal maintained in direct compression between said at least one radially inward facing peripheral surface of said annular groove and said relatively rotatable external surface, said rotary seal having a dynamic sealing lip located between said first surface and said structural surface of said annular groove, said dynamic sealing lip having a radially inwardly facing dynamic sealing surface in sealing contact with said relatively rotatable external surface, said dynamic sealing surface located radially inwardly of and encircled by said at least one radially inward facing peripheral surface of said annular groove;
   a pressurized fluid located between said first machine component and said relatively rotatable external surface and retained by said rotary seal;
   a backup ring located at least partially within said annular groove and located between said rotary seal and said extrusion gap and interposed between said first surface and said structural surface of said annular groove, said backup ring having generally oppositely facing first and second end surfaces and an outwardly facing outer surface radially spaced from, and free from direct contact with, said radially inward facing peripheral surface, at least a portion of said first end surface contacting and axially supporting at least a portion of said rotary seal and at least a portion of said second end surface facing said extrusion gap;
   said relatively rotatable external surface rotating relative to said rotary seal, said backup ring, and said first and second machine components; and
   said backup ring constructed at least in part from metal, and having a dynamic surface facing radially inward toward said relatively rotatable external surface and establishing at least one region of clearance between said dynamic surface and said relatively rotatable external surface extending from said first end surface to said second end surface and exposed to a lubricant, at least a portion of said region of clearance gradually diminishing in a circumferential direction providing gradual circumferential convergence between said ring dynamic surface and said relatively rotatable external surface, and forming a hydrodynamic inlet adapted for hydrodynamically wedging a portion of said lubricant between said ring dynamic surface and said relatively rotatable external surface in response to said relative rotation between said ring dynamic surface and said relatively rotatable external surface,
   wherein said ring dynamic surface is penetrated by at least one lubricant passage hole located between and axially spaced from said first and second end surfaces of said backup ring and defining first and second open ends, said first open end facing radially inward and said second open end facing radially outward and located radially outward of said first open end.

2. A rotary sealing, comprising:
   first and second machine components defining an annular groove comprising a first surface, a structural surface, and at least one radially inward facing peripheral surface, said first surface facing said structural surface of said annular groove;
   a relatively rotatable member defining a relatively rotatable external surface of generally cylindrical form located at least partially within said second machine component and separated from said second machine component by an extrusion gap;
   a rotary seal at least partially received in said annular groove, said rotary seal maintained in direct compression between said at least one radially inward facing peripheral surface of said annular groove and said relatively rotatable external surface, said rotary seal having a dynamic sealing lip located between said first surface and said structural surface of said annular groove, said dynamic sealing lip having a radially inwardly facing dynamic sealing surface in sealing contact with said relatively rotatable external surface, said dynamic sealing surface located radially inwardly of and encircled by said at least one radially inward facing peripheral surface of said annular groove;
   a pressurized fluid located between said first machine component and said relatively rotatable external surface and retained by said rotary seal;
   a backup ring located at least partially within said annular groove and located between said rotary seal and said extrusion gap and interposed between said first surface and said structural surface of said annular groove, said backup ring having generally oppositely facing first and second end surfaces and an outwardly facing outer surface radially spaced from, and free from direct contact with, said radially inward facing peripheral surface, at least a portion of said first end surface contacting and axially supporting at least a portion of said rotary seal and at least a portion of said second end surface facing said extrusion gap;

said relatively rotatable external surface rotating relative to said rotary seal, said backup ring, and said first and second machine components; and said backup ring constructed at least in part from metal, and having a dynamic surface facing radially inward toward said relatively rotatable external surface and establishing at least one region of clearance between said dynamic surface and said relatively rotatable external surface extending from said first end surface to said second end surface and exposed to a lubricant, at least a portion of said region of clearance gradually diminishing in a circumferential direction providing gradual circumferential convergence between said ring dynamic surface and said relatively rotatable external surface, and forming a hydrodynamic inlet adapted for hydrodynamically wedging a portion of said lubricant between said ring dynamic surface and said relatively rotatable external surface in response to said relative rotation between said ring dynamic surface and said relatively rotatable external surface, wherein said backup ring is penetrated by at least one lubricant passage hole located between and axially spaced from said first and second end surfaces of said backup ring and having first and second open ends and providing communication in a generally radially outward direction from said region of clearance, said first open end facing radially inward toward said relatively rotatable surface, and said second open end located radially outward of said first open end and facing radially outward and facing away from said relatively rotatable surface.

3. A rotary sealing assembly, comprising:

first and second machine components defining an annular groove comprising a first surface, a structural surface, and at least one radially inward facing peripheral surface, said first surface facing said structural surface of said annular groove;

a relatively rotatable member defining a relatively rotatable external surface of generally cylindrical form located at least partially within said second machine component and separated from said second machine component by an extrusion gap;

a rotary seal at least partially received in said annular groove, said rotary seal maintained in direct compression between said at least one radially inward facing peripheral surface of said annular groove and said relatively rotatable external surface, said rotary seal having a dynamic sealing lip located between said first surface and said structural surface of said annular groove, said dynamic sealing lip having a radially inwardly facing dynamic sealing surface in sealing contact with said relatively rotatable external surface, said dynamic sealing surface located radially inwardly of and encircled by said at least one radially inward facing peripheral surface of said annular groove;

a pressurized fluid located between said first machine component and said relatively rotatable external surface and retained by said rotary seal;

a backup ring located at least partially within said annular groove and located between said rotary seal and said extrusion gap and interposed between said first surface and said structural surface of said annular groove, said backup ring having generally oppositely facing first and second end surfaces and an outwardly facing outer surface radially spaced from, and free from direct contact with, said radially inward facing peripheral surface, at least a portion of said first end surface contacting and axially supporting at least a portion of said rotar seal and at least a portion of said second end surface facing said extrusion gap;

said relatively rotatable external surface rotating relative to said rotary seal, said backup ring, and said first and second machine components; and said backup ring constructed at least in part from metal, and having a dynamic surface facing radially inward toward said relatively rotatable external surface and establishing at least one region of clearance between said dynamic surface and said relatively rotatable external surface extending from said first end surface to said second end surface and exposed to a lubricant, at least a portion of said region of clearance gradually diminishing in a circumferential direction providing gradual circumferential convergence between said ring dynamic surface and said relatively rotatable external surface, and forming a hydrodynamic inlet adapted for hydrodynamically wedging a portion of said lubricant between said ring dynamic surface and said relatively rotatable external surface in response to said relative rotation between said ring dynamic surface and said relatively rotatable external surface, wherein a lubricant passage hole passes in a generally radial direction through at least a portion of said backup ring, communicating from said region of clearance between said ring dynamic surface and said relatively rotatable external surface, said lubricant passage hole being located between and in spaced relation to said first and second end surfaces of said backup ring, said lubricant passage hole having first and second open ends, said first open end facing radially inward and said second open end located radially outward of said first open end and facing radially outward.

4. The rotary sealing assembly of claim 3, wherein said outwardly facing outer surface is interrupted by at least one local recess engaged by a local projection, and no portion of said first end surface faces radially outward.

5. The rotary sealing assembly of claim 3, wherein said outwardly facing outer surface is interrupted by at least one local recess.

6. The rotary sealing assembly of claim 5, wherein said at least one local recess is engaged by a radially inwardly-oriented local projection.

7. The rotary sealing assembly of claim 3, wherein said backup ring includes an anti-rotation projection extending into a mating anti-rotation recess of said second machine component preventing said backup ring from rotating relative to said first and second machine components.

8. The rotary sealing assembly of claim 3, wherein an annular region is present between said outwardly facing outer surface of said backup ring and said groove radially inward facing peripheral surface with said annular region including an annular layer of resilient energizing material, and no portion of said first end surface faces radially outward toward said annular layer of resilient energizing material.

9. The rotary sealing assembly of claim 3, wherein one of said first and second machine components defines a lubricant communication passage.

10. The rotary sealing assembly of claim 3, wherein said backup ring is separated from said relatively rotatable external surface by a first distance at said region of clearance, and said second machine component is separated from said relatively rotatable external surface by a second distance at said extrusion gap, said first distance being less than said second distance.

11. The rotary sealing assembly of claim 3, wherein said rotary seal establishes static sealing engagement with at least one of said first and second machine components.

12. The rotary sealing assembly of claim 3, wherein said second end surface of said backup ring being substantially flat and oriented substantially normal to said relatively rotatable external surface and having inner and outer edges, and being an axial extremity of said backup ring facing and being located at least in part by said structural surface of said second machine component, said dynamic surface of said backup ring being oriented substantially normal to said second end surface of said backup ring, and wherein said second machine component has an inwardly facing surface establishing an outer boundary of said extrusion gap, and said inner edge of said second end surface being located radially inward relative to said inwardly facing surface of said second machine component, and said outer edge of said second end surface being located radially outward relative to said inwardly facing surface of said second machine component.

13. The rotary sealing assembly of claim 3, wherein said dynamic surface has a surface inside diameter and said relatively rotatable external surface has a surface outside diameter, and said inside surface diameter is larger than said outside surface diameter of said relatively rotatable external surface at the time of being installed onto said relatively rotatable external surface, said second end surface of said backup ring having inner and outer edges, said outer edge being located radially outward relative to said extrusion gap.

14. The rotary sealing assembly of claim 3, wherein said gradual circumferential convergence ends at a lubricated sliding interface between said ring dynamic surface and said relatively rotatable external surface.

15. The rotary sealing assembly of claim 3, wherein said backup ring consists of solid metal.

16. The rotary sealing assembly of claim 3, wherein said rotary seal contacts said first machine component.

17. The rotary sealing assembly of claim 3, wherein said first end surface of said backup ring is interrupted by at least one axially oriented anti-rotation hole having an open end surrounded by said first end surface of said backup ring and spaced from said outwardly facing outer surface of said backup ring, wherein application of a force to said rotary seal causes a portion of said rotary seal to protrude into said at least one anti-rotation hole.

18. The rotary sealing assembly of claim 17, wherein said at least one anti-rotation hole is a spotface.

19. The rotary sealing assembly of claim 3, wherein said first and second end surfaces of said backup ring are substantially flat and intersections between said first and second end surfaces and said dynamic surface form respective first and second corners and intersections between said first and second end surfaces and said outwardly facing outer surface form respective third and fourth corners, said first end surface extending radially outward from said first corner to said third corner, and said second end surface extending radially outward from said second corner to said fourth corner.

20. The rotary sealing assembly of claim 3, wherein said outwardly facing outer surface of said backup ring is exposed to a pressure generated force, and said dynamic surface and said outwardly facing outer surface move toward said relatively rotatable external surface as a result of said pressure generated force, and no portion of said first end surface of said backup ring faces radially outward.

21. A rotary sealing assembly, comprising:
first and second machine components surrounding at least a portion of an external generally cylindrical relatively rotatable surface of a shaft, said second machine component having an inwardly facing surface separated from said relatively rotatable surface by an extrusion gap;
a backup ring comprised of metal and having first and second end surfaces and surrounding a portion of said relatively rotatable surface and located between said first and second machine components and located next to a structural surface of said second machine component, and defining an inwardly oriented ring dynamic surface facing said relatively rotatable surface, and defining at least one outwardly facing outer surface located in intermediate relation to said first and second end surfaces and located radially outward of and surrounding at least part of said ring dynamic surface, said ring dynamic surface having a surface width when viewed in longitudinal cross-section, and at least a portion of said first end surface being flat;
a rotary seal surrounding a portion of said relatively rotatable surface, said relatively rotatable surface having relative rotation with respect to said rotary seal, said backup ring, and said first machine component, said rotary seal further defining a dynamic sealing lip having a lip dynamic surface held against, and establishing a sliding dynamic sealing interface with, said relatively rotatable surface;
at least a portion of said rotary seal and at least a portion of said relatively rotatable surface exposed to a fluid having a pressure, said rotary seal retaining said pressure of said fluid;
said backup ring located between at least a portion of said rotary seal and said extrusion gap, at least a portion of said first end surface of said backup ring contacting at least a portion of said rotar seal at least a portion of said rin d namic surface establishing a lubricated sliding dynamic interface with said relatively rotatable surface and at least a portion of said ring dynamic surface having a region of clearance with respect to said relatively rotatable surface, said region of clearance gradually diminishing in at least one circumferential direction establishing a hydrodynamic inlet, said region of clearance being exposed to a lubricant having a pressure, the pressure of said fluid being greater than the pressure of said lubricant;
said hydrodynamic inlet wedging at least a portion of said lubricant into said lubricated sliding dynamic interface in response to said relative rotation, a film of said lubricant being located between said relatively rotatable surface and said ring dynamic surface within said lubricated sliding dynamic interface; and
said backup ring incorporating at least one anti-rotation projection engaging at least one of said first and second machine components, said at least one outwardly facing outer surface being located radiall outward of said extrusion gap and radiall outward of said inwardly facing surface of said second machine component, said second end surface of said backup ring having inner and outer edges and said outer edge being located radially outward of said extrusion gap and radially outward of said inwardly facing surface of said second machine component,
wherein said ring dynamic surface is penetrated by at least one lubricant passage hole having oppositely facing first and second open ends, said first open end facing radially inward and said second open end located radially outward of said first open end and facing radially outward, said at least one lubricant passage hole being located between and axially separated from said first and second end surfaces of said backup ring.

22. A rotary sealing assembly, comprising:

first and second machine components surrounding at least a portion of an external generally cylindrical relatively rotatable surface of a shaft, said second machine component having an inwardly facing surface separated from said relatively rotatable surface by an extrusion gap;

a backup ring comprised of metal and having first and second end surfaces and surrounding a portion of said relatively rotatable surface and located between said first and second machine components and located next to a structural surface of said second machine component, and defining an inwardly oriented ring dynamic surface facing said relatively rotatable surface, and defining at least one outwardly facing outer surface located in intermediate relation to said first and second end surfaces and located radially outward of and surrounding at least part of said ring dynamic surface, said ring dynamic surface having a surface width when viewed in longitudinal cross-section, and at least a portion of said first end surface being flat;

a rotary seal surrounding a portion of said relatively rotatable surface, said relatively rotatable surface having relative rotation with respect to said rotary seal, said backup ring, and said first machine component, said rotary seal further defining a dynamic sealing lip having a lip dynamic surface held against, and establishing a sliding dynamic sealing interface with, said relatively rotatable surface;

at least a portion of said rotary seal and at least a portion of said relatively rotatable surface exposed to a fluid having a pressure, said rotary seal retaining said pressure of said fluid;

said backup ring located between at least a portion of said rotary seal and said extrusion gap, at least a portion of said first end surface of said backup ring contacting at least a portion of said rotary seal, at least a portion of said ring dynamic surface establishing a lubricated sliding dynamic interface with said relatively rotatable surface and at least a portion of said ring dynamic surface having a region of clearance with respect to said relatively rotatable surface, said region of clearance gradually diminishing in at least one circumferential direction establishing a hydrodynamic inlet, said region of clearance being exposed to a lubricant having a pressure, the pressure of said fluid being greater than the pressure of said lubricant;

said hydrodynamic inlet wedging at least a portion of said lubricant into said lubricated sliding dynamic interface in response to said relative rotation, a film of said lubricant being located between said relatively rotatable surface and said ring dynamic surface within said lubricated sliding dynamic interface; and said backup ring incorporating at least one anti-rotation projection engaging at least one of said first and second machine components, said at least one outwardly facing outer surface being located radially outward of said extrusion gap and radially outward of said inwardly facing surface of said second machine component, said second end surface of said backup ring having inner and outer edges and said outer edge being located radially outward of said extrusion gap and radially outward of said inwardly facing surface of said second machine component, wherein said backup ring is penetrated by at least one lubricant passage hole having oppositely facing first and second open ends and a generally radially oriented passage hole length between said first and second open ends, said at least one lubricant passage hole being located in intermediate relation to and axially spaced from said first and second end surfaces of said backup ring and providing communication in a generally radially outward direction from said region of clearance, said first open end facing radially inward toward said relatively rotatable surface and opening into said region of clearance, and said second open end facing radially outward away from said relatively rotatable surface.

23. The rotary sealing assembly of claim 22, wherein said sliding dynamic interface occurs when said portion of said ring dynamic surface is forced against said relatively rotatable surface.

24. The rotary sealing assembly of claim 22, wherein at least a portion of said ring dynamic surface has gradual convergence with said relatively rotatable surface in a circumferential direction.

25. The rotary sealing assembly of claim 22, wherein said first end surface of said backup ring defines at least one anti-rotation recess in the form of a local hole.

26. The rotary sealing assembly of claim 22, wherein at least a portion of said rotary seal is compressed radially between said relatively rotatable surface and at least one of said first and second machine components, establishing a sealed relationship between said rotary seal and at least one of said first and second machine components.

27. The rotary sealing assembly of claim 22, wherein said rotary seal defines a hydrodynamic inlet wedging a film of said fluid into said sliding dynamic sealing interface in response to said relative rotation.

28. The rotary sealing assembly of claim 22, wherein said machine component incorporates a lubricant communication passage.

29. The rotary sealing assembly of claim 22, wherein said region of clearance is smaller than said extrusion gap at the time of installing said backup ring onto said relatively rotatable surface, said second end surface of said backup ring having inner and outer edges, all of said inner edge being located radially inward of said inwardly facing surface of said second machine component.

30. The rotary sealing assembly of claim 22, wherein said ring dynamic surface extends and terminates at said first end surface of said backup ring, an intersection between said first end surface of said backup ring and said ring dynamic surface forms an external corner, said ring dynamic surface being substantially parallel to said relatively rotatable surface when viewed in longitudinal cross-section, and said second end surface of said backup ring occluding occludes an annular portion of said extrusion gap.

31. A rotary sealing assembly, comprising:

first and second machine components surrounding at least a portion of an external generally cylindrical relatively rotatable surface of a shaft, said second machine component having an inwardly facing surface separated from said relatively rotatable surface by an extrusion gap;

a backup ring comprised of metal and having first and second end surfaces and surrounding a portion of said relatively rotatable surface and located between said first and second machine components and located next to a structural surface of said second machine component, and defining an inwardly oriented ring dynamic surface facing said relatively rotatable surface, and defining at least one outwardly facing outer surface located in intermediate relation to said first and second end surfaces and located radially outward of and surrounding at least part of said ring dynamic surface, said ring dynamic surface having a surface width when viewed in longitudinal cross-section, and at least a portion of said first end surface being flat;

a rotary seal surrounding a portion of said relatively rotatable surface, said relatively rotatable surface having relative rotation with respect to said rotary seal, said backup ring, and said first machine component, said rotary seal further defining a dynamic sealing lip having a lip dynamic surface held against, and establishing a sliding dynamic sealing interface with, said relatively rotatable surface;

at least a portion of said rotary seal and at least a portion of said relatively rotatable surface exposed to a fluid having a pressure, said rotary seal retaining said pressure of said fluid;

said backup ring located between at least a portion of said rotary seal and said extrusion gap, at least a portion of said first end surface of said backup ring contacting at least a portion of said rotary seal, at least a portion of said ring dynamic surface establishing a lubricated sliding dynamic interface with said relatively rotatable surface and at least a portion of said ring dynamic surface having a region of clearance with respect to said relatively rotatable surface, said region of clearance gradually diminishing in at least one circumferential direction establishing a hydrodynamic inlet, said region of clearance being exposed to a lubricant having a pressure, the pressure of said fluid being greater than the pressure of said lubricant;

said hydrodynamic inlet wedging at least a portion of said lubricant into said lubricated sliding dynamic interface in response to said relative rotation, a film of said lubricant being located between said relatively rotatable surface and said ring dynamic surface within said lubricated sliding dynamic interface; and said backup ring incorporating at least one anti-rotation projection engaging at least one of said first and second machine components, said at least one outwardlfacing outer surface being located radially outward of said extrusion gap and radially outward of said inwardly facing surface of said second machine component, said second end surface of said backup ring having inner and outer edges and said outer edge being located radially outward of said extrusion gap and radially outward of said inwardly facing surface of said second machine component, wherein a lubricant passage hole in said ring dynamic surface passes through at least a portion of said backup ring in a generally radial direction, communicating from said region of clearance between said ring dynamic surface and said relatively rotatable surface, said lubricant passage hole being located between said first and second end surfaces of said backup ring and spaced away from said second end surface, and having an inwardly facing open end and an outwardly facing open end, said lubricant passage hole extending between said inwardly facing open end and said outwardly facing open end, and said outwardly facing open end being located radially outward from said inwardly facing open end.

32. A rotary sealing assembly, comprising:
a machine component;
a relatively rotatable member defining a relatively rotatable surface of generally cylindrical form separated from said machine component by an extrusion gap;
a rotary seal in sealing contact with said relatively rotatable surface, said rotary seal arranged and designed to retain a fluid; and
a backup ring located between said rotary seal and said extrusion gap;
wherein said backup ring has a ring dynamic surface facing said relatively rotatable surface and establishing a hydrodynamic inlet having a region of clearance between said dynamic surface of said backup ring and said relatively rotatable surface, said region of clearance gradually diminishing in a circumferential direction providing gradual circumferential convergence between said ring dynamic surface and said relatively rotatable surface, terminating in a region of contact between a part of said ring dynamic surface and said relatively rotatable surface,
wherein said backup ring defines at least one weakening recess, and wherein, upon application of a force to said backup ring, said weakening recess is arranged and designed to distribute said force around said backup ring so that portions of said ring dynamic surface contact said relatively rotatable surface and portions of said ring dynamic surface do not contact said relatively rotatable surface, thereby forming said at least one hydrodynamic inlet.

33. The rotary sealing assembly of claim 32, wherein at least one projection projects radially inward from said ring dynamic surface and wherein said at least one projection contacts said relatively rotatable surface upon application of said force.

34. The rotary sealing assembly of claim 32, wherein said rotary seal is in sealing engagement with said machine component.

35. The rotary sealing assembly of claim 32, wherein said force is fluid pressure.

36. The rotary sealing assembly of claim 32, wherein said backup ring is configured to receive said force at least partially through at least one outwardly facing outer surface.

37. The rotary sealing assembly of claim 36, wherein at least part of said at least one outwardly facing outer surface contacts said rotary seal.

38. The rotary sealing assembly of claim 36, wherein said force is applied to said outwardly facing outer surface through a resilient energizing material.

39. The rotary sealing assembly of claim 38, wherein said resilient energizing material is integral to said rotary seal.

40. The rotary sealing assembly of claim 36, wherein said force received at least partially through said at least one outwardly facing outer surface causes said inwardly facing ring dynamic surface and said at least one outwardly facing outer surface to become smaller.

41. The rotary sealing assembly of claim 32, wherein at least one surface of said backup ring defines an anti-rotation recess.

42. The rotary sealing assembly of claim 32, wherein said backup ring defines at least one anti-rotation recess, and differential pressure acting on said rotary seal causes a portion of said rotary seal to protrude into said at least one anti-rotation recess.

43. The rotary sealing assembly of claim 32, wherein said backup ring includes at least one anti-rotation projection configured to engage said machine component and prevent rotation of said backup ring with respect thereto.

44. The rotary sealing assembly of claim 32, wherein said rotary seal has a modulus of elasticity, said backup ring has a modulus of elasticity, and said modulus of elasticity of said backup ring is greater than said modulus of elasticity of said rotary seal.

45. The rotary sealing assembly of claim 32, wherein said dynamic surface of said backup ring is composed of solid metal.

46. The rotary sealing assembly of claim 32, wherein said backup ring is composed of solid metal.

47. The rotary sealing assembly of claim 32, wherein said ring dynamic surface is penetrated by at least one lubricant passage hole having first and second open ends, said second open end being radially spaced from said first open end.

48. The rotary sealing assembly of claim 32, wherein said dynamic surface of said backup ring is substantially parallel to said relatively rotatable surface when viewed in longitudinal cross-section.

49. The rotary sealing assembly of claim 32, wherein said force is applied through a portion of said rotary seal.

50. The rotary sealing assembly of claim 32, wherein at least a portion of said backup ring is exposed to a lubricant and wherein, upon relative rotation between said backup ring and said relatively rotatable surface, said hydrodynamic inlet wedges a film of said lubricant between said backup ring and said relatively rotatable surface.

51. The rotary sealing assembly of claim 32, wherein said rotary seal comprises a flexible dynamic lip establishing the sealing contact with said relatively rotatable surface.

52. A rotary sealing assembly, comprising:
a machine component;
a relatively rotatable member defining a relatively rotatable surface of generally cylindrical form separated from said machine component by an extrusion gap;
a rotary seal in sealing contact with said relatively rotatable surface, said rotary seal arranged and designed to retain a fluid; and
a backup ring located between said rotary seal and said extrusion gap;
wherein said backup ring has at least one dynamic surface facing said relatively rotatable surface and establishing a hydrodynamic inlet having a region of clearance between said dynamic surface of said backup ring and said relatively rotatable surface, said region of clearance gradually diminishing in a circumferential direction providing gradual circumferential convergence between said ring dynamic surface and said relatively rotatable surface, terminating in a region of contact between a part of said ring dynamic surface and said relatively rotatable surface,
wherein said ring dynamic surface faces radially inward, said backup ring defining a radially outward facing second surface located radially outward from and in spaced relation to said ring dynamic surface, and a lubricant passage hole communicating from said ring dynamic surface to said second surface.

53. The rotary sealing assembly of claim 52, wherein said region of contact results from a force applied to said backup ring.

54. The rotary sealing assembly of claim 53, wherein said force is applied through a portion of said rotary seal.

55. The rotary sealing assembly of claim 53, wherein said force is a result of fluid pressure.

56. The rotary sealing assembly of claim 52, wherein said rotary seal contacts said machine component.

57. The rotary sealing assembly of claim 52, wherein said machine component includes at least one structural surface that contacts said backup ring.

58. The rotary sealing assembly of claim 52, wherein at least one surface of said backup ring defines an anti-rotation recess.

59. The rotary sealing assembly of claim 52, wherein at least a portion of said backup ring is exposed to a lubricating fluid and wherein, upon relative rotation between said backup ring and said relatively rotatable surface, said hydrodynamic inlet wedges a film of said lubricating fluid between said backup ring and said relatively rotatable surface.

60. The rotary sealing assembly of claim 52, wherein said backup ring defines at least one anti-rotation recess, and differential pressure acting on said rotary seal causes a portion of said rotary seal to protrude into said at least one anti-rotation recess.

61. The rotary sealing assembly of claim 52, wherein said backup ring includes at least one anti-rotation projection.

62. The rotary sealing assembly of claim 52, wherein said rotary seal is maintained in direct compression between said machine component and said relatively rotatable surface.

63. The rotary sealing assembly of claim 52, wherein said sealing contact with said relatively rotatable surface is established by a flexible dynamic lip of said rotary seal.

64. The rotary sealing assembly of claim 52, wherein said dynamic surface of said backup ring is composed of solid metal.

65. The rotary sealing assembly of claim 52, wherein said backup ring is composed of solid metal.

66. The rotary sealing assembly of claim 52, wherein said backup ring defines at least one weakening recess.

67. The rotary sealing assembly of claim 52, wherein said dynamic surface of said backup ring is substantially parallel to said relatively rotatable surface when viewed in longitudinal cross-section.

68. A rotary sealing assembly, comprising:
first and second machine components;
a relatively rotatable member defining a relatively rotatable surface of generally cylindrical form located at least partially within said second machine component and separated from said second machine component by an extrusion gap;
a rotary seal having a dynamic sealing lip in sealing contact with said relatively rotatable surface;
a pressurized fluid located between said first machine component and said relatively rotatable surface and retained by said rotary seal;
a backup ring located between said rotary seal and said extrusion gap and having first and second ends, at least a portion of said first end contacting and supporting at least a portion of said rotary seal and at least a portion of said second end facing said extrusion gap;
said relatively rotatable surface rotating relative to said rotary seal, said backup ring, and said first and second machine components;
said backup ring being constructed at least in part from metal, and having a dynamic surface facing radially inward toward said relatively rotatable surface and establishing at least one region of clearance between said dynamic surface of said backup ring and said relatively rotatable surface extending from said first end to said second end, at least a portion of said region of clearance gradually diminishing in a circumferential direction providing gradual circumferential convergence between said ring dynamic surface and said relatively rotatable surface, and forming a hydrodynamic inlet terminating in a region of sliding contact between said ring dynamic surface and said relatively rotatable surface; and said region of clearance between said ring dynamic surface and said relatively rotatable surface being exposed to a lubricant, said hydrodynamic inlet wedging a film of said lubricant into said region of sliding contact between said ring dynamic surface and said relatively rotatable surface, wherein said backup ring defines a radially outwardly-facing surface located radially outward from and in spaced relation to said ring dynamic surface, a lubricant passage hole communicating from said ring dynamic surface to said radially outwardly-facing surface.

69. A rotary sealing assembly, comprising:

first and second machine components surrounding at least a portion of a generally cylindrical relatively rotatable surface of a shaft, said second machine component being separated from said relatively rotatable surface by an extrusion gap;

a fluid having a pressure being present between at least a portion of said first machine component and at least a portion of said relatively rotatable surface;

an un-split backup ring surrounding a portion of said relatively rotatable surface and located next to a structural surface of said second machine component, and defining at least one ring dynamic surface facing said relatively rotatable surface;

a rotary seal surrounding a portion of said relatively rotatable surface and retaining said pressure of said fluid, said relatively rotatable surface having relative rotation with respect to said rotary seal, said backup ring, and said second machine component;

said rotary seal further defining a dynamic sealing lip having a lip dynamic surface held against, and establishing a sliding dynamic sealing interface with, said relatively rotatable surface;

said backup ring located between said rotary seal and said extrusion gap, at least a portion of said backup ring being in supporting contact with at least a portion of said rotary seal, at least a portion of said ring dynamic surface contacting and establishing a sliding dynamic interface with said relatively rotatable surface and at least a portion of said ring dynamic surface having a region of clearance with respect to said relatively rotatable surface, at least said portion of said ring dynamic surface contacting said relatively rotatable surface being metal, said region of clearance between at least said portion of said ring dynamic surface and said relatively rotatable surface being exposed to a lubricant having a pressure, the pressure of said fluid being greater than the pressure of said lubricant;

said backup ring hydrodynamically wedging a film of said lubricant into said sliding dynamic interface in response to said relative rotation, wherein said backup ring defines a radially outwardly-facing surface located radially outward from and in spaced relation to said ring dynamic surface, a lubricant passage hole communicating from said ring dynamic surface to said radially outwardly-facing surface.

70. A rotary sealing assembly, comprising:

a machine component surrounding at least a portion of a generally cylindrical relatively rotatable surface of a shaft and separated from said relatively rotatable surface by an extrusion gap;

a metal backup ring surrounding a portion of said relatively rotatable surface and located next to a structural surface of said machine component, and defining at least one ring dynamic surface facing said relatively rotatable surface;

a rotary seal surrounding said relatively rotatable surface, said relatively rotatable surface having relative rotation with respect to said rotary seal, said metal backup ring, and said machine component, said rotary seal further defining a dynamic sealing lip having a lip dynamic surface held against, and establishing a sliding dynamic sealing interface with, said relatively rotatable surface;

at least a portion of said rotary seal and at least a portion of said relatively rotatable surface exposed to a fluid having a pressure, said rotary seal retaining said pressure;

said metal backup ring being located between said rotary seal and said extrusion gap, at least a portion of said metal backup ring contacting at least a portion of said rotary seal, at least a portion of said ring dynamic surface contacting and establishing a sliding dynamic interface with said relatively rotatable surface and at least a portion of said ring dynamic surface having a region of clearance with respect to said ring dynamic surface that gradually diminishes in at least one circumferential direction establishing a hydrodynamic inlet, said region of clearance being exposed to a lubricant having a pressure, the pressure of said fluid being greater than the pressure of said lubricant;

said hydrodynamic inlet wedging a film of said lubricant into said dynamic interface in response to said relative rotation, wherein said metal backup ring defines a radially outwardly-facing surface located radially outward from and in spaced relation to said ring dynamic surface, a lubricant passage hole communicating from said ring dynamic surface to said radially outwardly-facing surface.

71. A rotary sealing assembly, comprising:

a relatively rotatable member defining a relatively rotatable surface of generally cylindrical external form having a surface diameter;

first and second machine components encircling at least a portion of said relatively rotatable surface, an annular inwardly facing surface of said second machine component facing said relatively rotatable surface and separated from said relatively rotatable surface by an extrusion gap, said second machine component having an annular recessed cavity comprising an annular inwardly facing peripheral surface oriented in generally opposed relation to said relatively rotatable surface, and an annular structural surface forming an internal shoulder, and said first machine component defining an annular retaining surface facing and in generally opposed relation to said annular structural surface;

said relatively rotatable member being rotatable relative to said second machine component;

a fluid located at least partially within said first machine component;

a rotary seal encircling a portion of said relatively rotatable surface and defining a dynamic lip with a generally inwardly facing dynamic sealing surface having a width and being in sealing contact with said relatively rotatable surface over said width, said rotary seal being exposed to and retaining said fluid; and a backup ring encircling said relatively rotatable surface and located between said rotary seal and said extrusion gap and also located between said retaining surface of said first machine component and said structural surface of said second machine component, and also located at least partially within said recessed cavity, said backup ring comprising:

first and second generally oppositely facing ring end surfaces, at least part of said first ring end surface facing and being in contact with and axially supporting at least part of said rotary seal and being located between said retaining surface of said first machine component and said structural surface of said second machine component, said second ring end surface being substantially flat and oriented substantially normal to said relatively rotatable surface, and facing said structural surface and being located at least in part by an abutting relationship between said second ring end surface and said structural surface of said second machine component;

at least one inwardly facing dynamic surface located in intermediate relation to said first and second ring end surfaces and encircling and facing said relatively rotatable surface, said dynamic surface having a surface diameter that is larger than said surface diameter of said relatively rotatable surface at the time of said backup ring being installed onto said relatively rotatable surface;

said at least one inwardly facing dynamic surface oriented substantially normal to said second ring end surface;

at least one outwardly facing outer surface located in intermediate relation to said first and second ring end surfaces and located radially outward of and surrounding at least part of said at least one inwardly facing dynamic surface, said at least one outwardly facing outer surface oriented in generally opposed relation to said annular inwardly facing peripheral surface of said recessed cavity, and being and remaining separated from said annular inwardly facing peripheral surface of said recessed cavity, and said at least one outwardly facing outer surface located radially outward relative to said dynamic lip;

a region of radial clearance between said dynamic surface of said backup ring and said relatively rotatable surface, said region of radial clearance having a length in a circumferential direction, said region of radial clearance gradually diminishing in the circumferential direction along at least part of said length, providing gradual convergence between said dynamic surface and said relatively rotatable surface in the circumferential direction, terminating in a static interface between a part of said inwardly facing dynamic surface and a part of said relatively rotatable surface when relative rotation is absent between said inwardly facing dynamic surface and said relatively rotatable surface, said static interface becoming a dynamic interface when relative rotation is present between said inwardly facing dynamic surface and said relatively rotatable surface;

a lubricant located within said region of radial clearance and contacting and wetting at least a portion of said relatively rotatable surface, and a film of said lubricant being present within said dynamic interface when said relative rotation is present between said inwardly facing dynamic surface and said relatively rotatable surface, said relative rotation dragging said film of said lubricant past said gradual convergence and into said dynamic interface, wherein said backup ring has at least one lubricant passage hole having oppositely facing first and second open ends and located in intermediate relation with respect to said first and second oppositely facing ring end surfaces, said first open end facing radially inward toward said relatively rotatable surface and communicating from said region of radial clearance and said second open end facing radially outward away from said relatively rotatable surface and located radially outward of said first open end.

72. The rotary sealing assembly of claim 71, wherein said dynamic interface results from a force applied to said backup ring.

73. The rotary sealing assembly of claim 72, wherein said force is a result of fluid pressure.

74. The rotary sealing assembly of claim 72, wherein at least one projection projects radially inward from said inwardly facing dynamic surface and wherein said at least one projection contacts said relatively rotatable surface upon application of said force, thereby maintaining said region of radial clearance between said inwardly facing dynamic surface and said relatively rotatable surface.

75. The rotary sealing assembly of claim 72, wherein said backup ring is configured to receive said force at least partially through said at least one outwardly facing outer surface, and no portion of said first ring end surface faces radially outward.

76. The rotary sealing assembly of claim 71, wherein said rotary seal contacts said first machine component.

77. The rotary sealing assembly of claim 71, wherein at least one of said first and second generally oppositely facing ring end surfaces of said backup ring defines an anti-rotation recess in the form of a local hole that is radially spaced from, and located in intermediate relation to, said at least one inwardly facing dynamic surface and said at least one outwardly facing outer surface.

78. The rotary sealing assembly of claim 71, wherein said rotary seal has a seal end surface facing said first ring end surface of said backup ring and said first ring end surface of said backup ring is interrupted by at least one anti-rotation recess in the form of a hole, wherein application of a force to said rotary seal causes a portion of said seal end surface of said rotary seal to protrude into said at least one anti-rotation recess.

79. The rotary sealing assembly of claim 71, wherein said backup ring includes at least one anti-rotation projection engaging one of said first and second machine components and preventing rotation of said backup ring with respect thereto, and said at least one outwardly facing outer surface is located radially outward of said extrusion gap.

80. The rotary sealing assembly of claim 71, wherein said rotary seal is maintained in direct radial compression between one of said first and second machine components and said relatively rotatable surface, said direct radial compression establishing said sealing contact between said generally inwardly facing dynamic sealing surface of said dynamic lip and said relatively rotatable surface.

81. The rotary sealing assembly of claim 71, wherein said rotary seal has a modulus of elasticity, said backup ring has a modulus of elasticity, and said modulus of elasticity of said backup ring is greater than said modulus of elasticity of said rotary seal.

82. The rotary sealing assembly of claim 71, wherein said dynamic surface is a surface of solid metal.

83. The rotary sealing assembly of claim 71, wherein said backup ring is composed of solid metal.

84. The rotary sealing assembly of claim 71, wherein said at least one outwardly facing outer surface is interrupted by at least one local recess.

85. The rotary sealing assembly of claim 71, wherein said second ring end surface is an axial extremity of said backup ring and said-at least one local recess interrupts said second ring end surface.

86. The rotary sealing assembly of claim 71, wherein said backup ring defines at least one weakening recess located radially outward of said dynamic lip.

87. The rotary sealing assembly of claim 71, wherein one of said first and second machine components incorporates a lubricant communication passage.

88. The rotary sealing assembly of claim 71, wherein said at least one inwardly facing dynamic surface is substantially parallel to said relatively rotatable surface when viewed in longitudinal cross-section and said first end surface is substantially flat and oriented substantially perpendicular to said relatively rotatable surface when viewed in longitudinal cross-section, supporting said dynamic lip in an axial direction.

89. The rotary sealing assembly of claim 71, wherein said dynamic lip has a flat lip end surface facing and contacting said first ring end surface, and a portion of said first ring end surface located nearest to said inwardly facing dynamic surface is substantially flat and substantially parallel to said second ring end surface, supporting said flat lip end surface of said dynamic lip in an axial direction.

90. The rotary sealing assembly of claim 71, wherein said inwardly facing dynamic surface is located radially inward of and spaced from said annular inwardly facing surface of said second machine component and wherein said second ring end surface has inner and outer edges, said inner edge of said second ring end surface being located radially inward of said annular inwardly facing surface of said second machine component and said outer edge of said second ring end surface being located radially outward of said annular inwardly facing surface of said second machine component and radially outward of said extrusion gap.

91. The rotary sealing assembly of claim 71, wherein a force applied to said at least one outwardly facing outer surface causes said at least one inwardly facing dynamic surface and said at least one outwardly facing outer surface to move toward said relatively rotatable surface, and no portion of said first end surface of said backup ring faces radially outward.

92. The rotary sealing assembly of claim 71, wherein said at least one outwardly facing outer surface is the outermost annular surface of said backup ring, and said at least one outwardly facing outer surface and said at least one inwardly facing dynamic surface extend to said second ring end surface of said backup ring.

93. The rotary sealing assembly of claim 71, wherein said inwardly facing dynamic surface is located radially inward of and entirely surrounded by said at least one outwardly facing outer surface, and said at least one outwardly facing outer surface is the outermost surface of said backup ring.

94. A rotary sealing assembly, comprising:
a relatively rotatable member defining a relatively rotatable surface of generally cylindrical external form having a surface diameter;
first and second machine components encircling at least a portion of said relatively rotatable surface, an annular inwardly facing surface of said second machine component facing said relatively rotatable surface and separated from said relatively rotatable surface by an extrusion gap, said second machine component having an annular recessed cavity comprising an annular inwardly facing peripheral surface oriented in generally opposed relation to said relatively rotatable surface, and an annular structural surface forming an internal shoulder, and said first machine component defining an annular retaining surface facing and in generally opposed relation to said annular structural surface;
said relatively rotatable member being rotatable relative to said second machine component;
a fluid located at least partially within said first machine component;
a rotary seal encircling a portion of said relatively rotatable surface and defining a dynamic lip with a generally inwardly facing dynamic sealing surface having a width and being in sealing contact with said relatively rotatable surface over said width, said rotary seal being exposed to and retaining said fluid; and
a backup ring encircling said relatively rotatable surface and located between said rotary seal and said extrusion gap and also located between said retaining surface of said first machine component and said structural surface of said second machine component, and also located at least partially within said recessed cavity, said backup ring comprising:
first and second generally oppositely facing ring end surfaces, at least part of said first ring end surface facing and being in contact with and axially supporting at least part of said rotary seal and being located between said retaining surface of said first machine component and said structural surface of said second machine component, said second ring end surface being substantially flat and oriented substantially normal to said relatively rotatable surface, and facing said structural surface and being located at least in part by an abutting relationship between said second ring end surface and said structural surface of said second machine component;
at least one inwardly facing dynamic surface located in intermediate relation to said first and second ring end surfaces and encircling and facing said relatively rotatable surface, said dynamic surface having a surface diameter that is larger than said surface diameter of said relatively rotatable surface at the time of said backup ring being installed onto said relatively rotatable surface;
said at least one inwardly facing dynamic surface oriented substantially normal to said second ring end surface;
at least one outwardly facing outer surface located in intermediate relation to said first and second ring end surfaces and located radially outward of and surrounding at least part of said at least one inwardly facing dynamic surface, said at least one outwardly facing outer surface oriented in generally opposed relation to said annular inwardly facing peripheral surface of said recessed cavity, and being and remaining separated from said annular inwardly facing peripheral surface of said recessed cavity, and said at least one outwardly facing outer surface located radially outward relative to said dynamic lip;
a region of radial clearance between said dynamic surface of said backup ring and said relatively rotatable surface, said region of radial clearance having a length in a circumferential direction, said region of radial clearance gradually diminishing in the circumferential direction along at least part of said length, providing gradual convergence between said dynamic surface and said relatively rotatable surface in the circumferential direction, terminating in a static interface between a part of said inwardly facing dynamic surface and a part of said relatively rotatable surface when relative rotation is absent between said inwardly facing dynamic surface and said relatively rotatable surface, said static interface becoming a dynamic interface when relative rotation is present between said inwardly facing dynamic surface and said relatively rotatable surface;

a lubricant located within said region of radial clearance and contacting and wetting at least a portion of said relatively rotatable surface, and a film of said lubricant being present within said dynamic interface when said relative rotation is present between said inwardly facing dynamic surface and said relatively rotatable surface, said relative rotation dragging said film of said lubricant past said gradual convergence and into said dynamic interface, wherein a lubricant passage hole located between and spaced apart from said first and second generally oppositely facing ring end surfaces and having oppositely facing first and second open ends passes radially outward through at least a portion of said backup ring, communicating from said region of radial clearance between said inwardly facing dynamic surface and said relatively rotatable surface to an open area located radially outward of said dynamic surface, said first open end facing in a generally radially inward direction and said second open end facing in a generally radially outward direction.

* * * * *